US010524121B2

(12) United States Patent
Sato et al.

(10) Patent No.: US 10,524,121 B2
(45) Date of Patent: Dec. 31, 2019

(54) APPARATUS, SYSTEM AND METHOD FOR NETWORK CONNECTION RIGHT MANAGEMENT

(75) Inventors: Masanori Sato, Tokyo (JP); Katsutoshi Itoh, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/235,822

(22) PCT Filed: Aug. 8, 2012

(86) PCT No.: PCT/JP2012/070186
§ 371 (c)(1),
(2), (4) Date: Jan. 29, 2014

(87) PCT Pub. No.: WO2013/031501
PCT Pub. Date: Mar. 7, 2013

(65) Prior Publication Data
US 2014/0228002 A1    Aug. 14, 2014

(30) Foreign Application Priority Data

Aug. 26, 2011   (JP) .................................. 2011-184231

(51) Int. Cl.
*H04M 1/66* (2006.01)
*H04M 1/68* (2006.01)
(Continued)

(52) U.S. Cl.
CPC ............. *H04W 12/06* (2013.01); *H04W 4/16* (2013.01)

(58) Field of Classification Search
CPC ....... H04W 4/005; H04W 4/08; H04W 8/186; H04W 12/04; H04W 12/06; H04W 84/045; H04W 88/16
(Continued)

(56) References Cited

U.S. PATENT DOCUMENTS

2002/0077129 A1    6/2002  Kikuta et al.
2003/0187868 A1*  10/2003  Igarashi .................... 707/102
(Continued)

FOREIGN PATENT DOCUMENTS

CA    2 766 314    * 12/2010    ............. H04W 8/18
CN    1356834 A      7/2002
(Continued)

OTHER PUBLICATIONS

3GPP TR 33.812 V9.2.0 (Jun. 2010) Technical Report. 3rd Generation Partnership Project; Technical Specification Group Services and System Aspects; Feasibility study on the security aspects of remote provisioning and change of subscription for Machine to Machine (M2M) equipment (Release 9). Jun. 2010.
(Continued)

*Primary Examiner* — Rafael Pérez-Gutiérrez
*Assistant Examiner* — Mark G. Pannell
(74) *Attorney, Agent, or Firm* — Chip Law Group

(57) ABSTRACT

Provided is an information processing apparatus including a receiving unit that receives an execution request to cause a wireless communication apparatus to execute a specific function by using a connection right to connect to a predetermined network using wireless communication. The connection right is set to a first wireless communication apparatus not including the specific function when the execution request is received, and when the connection right is not set to a second wireless communication apparatus including the specific function, the connection right is made to be set to the second wireless communication apparatus to cause the second wireless communication apparatus to execute the specific function in accordance with the execution request.

20 Claims, 26 Drawing Sheets

(51) Int. Cl.
  *H04M 3/16* (2006.01)
  *G06F 15/16* (2006.01)
  *G06F 9/32* (2018.01)
  *H04W 12/06* (2009.01)
  *H04W 4/16* (2009.01)
(58) Field of Classification Search
  USPC .................................................. 455/411
  See application file for complete search history.

(56) References Cited

U.S. PATENT DOCUMENTS

| | | | |
|---|---|---|---|
| 2004/0142684 A1* | 7/2004 | Ratert | H04W 8/205 455/420 |
| 2008/0102794 A1* | 5/2008 | Keevill | H04L 12/5692 455/411 |
| 2008/0261561 A1* | 10/2008 | Gehrmann | H04W 8/205 455/411 |
| 2010/0223359 A1* | 9/2010 | Runstedler et al. | 709/219 |
| 2010/0312897 A1* | 12/2010 | Allen et al. | 709/227 |
| 2010/0315668 A1* | 12/2010 | Aoki | 358/1.15 |
| 2010/0316206 A1* | 12/2010 | Chang | H04M 3/42008 379/201.01 |
| 2011/0035584 A1* | 2/2011 | Meyerstein et al. | 713/155 |
| 2011/0084818 A1* | 4/2011 | Graham | H04M 1/663 340/407.1 |
| 2011/0099605 A1* | 4/2011 | Cha et al. | 726/3 |
| 2012/0047276 A1* | 2/2012 | Lindquist et al. | 709/228 |
| 2012/0113937 A1* | 5/2012 | Aramoto et al. | 370/329 |
| 2013/0121483 A1* | 5/2013 | Murakami | H04M 1/72519 379/212.01 |
| 2013/0208703 A1* | 8/2013 | Sugimoto et al. | 370/331 |
| 2013/0254544 A1* | 9/2013 | Hjelm | H04L 9/085 713/171 |
| 2014/0220900 A1* | 8/2014 | Carlton et al. | 455/41.2 |

FOREIGN PATENT DOCUMENTS

| | | |
|---|---|---|
| EP | 2120481 A1 | 11/2009 |
| JP | 2002-209272 | 7/2002 |
| JP | 2002-209272 A | 7/2002 |
| JP | 2006-074103 A | 3/2006 |
| WO | 2008/059758 A1 | 5/2008 |
| WO | WO 2008/059758 | 5/2008 |
| WO | WO 2008/128874 | 10/2008 |
| WO | 2010/129426 A1 | 11/2010 |
| WO | WO 2010/129426 A1 | 11/2010 |

OTHER PUBLICATIONS

3GPP TS 23.237 V11.2.0 (Sep. 2011) Technical Specification, 3rd Generation Partnership Project; Technical Specification Group Services and System Aspects; IP Multimedia Subsystem (IMS) Service Continuity; Stage 2 (Release 11), Aug. 24, 2011, 154 pages.

Office Action for CN Patent Application No. 201280040476.7, dated Feb. 23, 2017, 13 pages of Office Action and 16 pages of English Translation.

Office Action for JP Patent Application No. 2016-110628, dated Apr. 25, 2017, 03 pages of Office Action and 03 pages of English Translation.

Office Action for CN Patent Application No. 201280040476.7, dated Sep. 18, 2017, 09 pages of Office Action and 11 pages English Translation.

"3rd Generation Partnership Project; Technical Specification Group Services and System Aspects; Feasibility study on the security aspects of remote provisioning and change of subscription for Machine to Machine (M2M) equipment", 3GPP TR 33.812 V9.2.0, Release 9, Jun. 2010, 4 pages.

* cited by examiner

FIG. 1
DURING GAME (FIRST WIRELESS COMMUNICATION APPARATUS HOLDS MCIM)
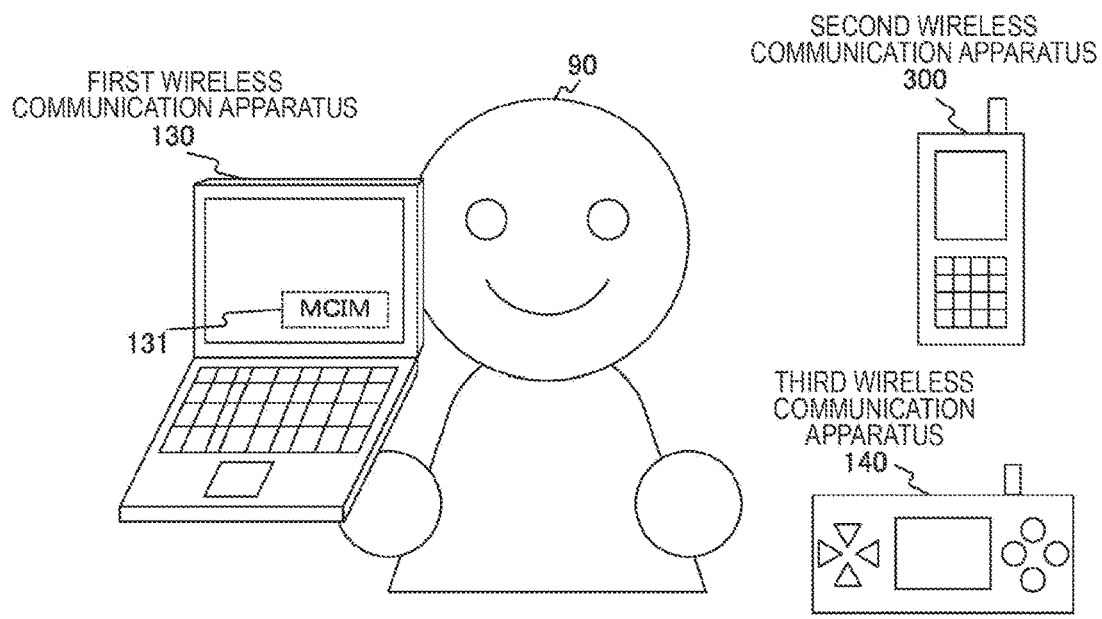
(a)
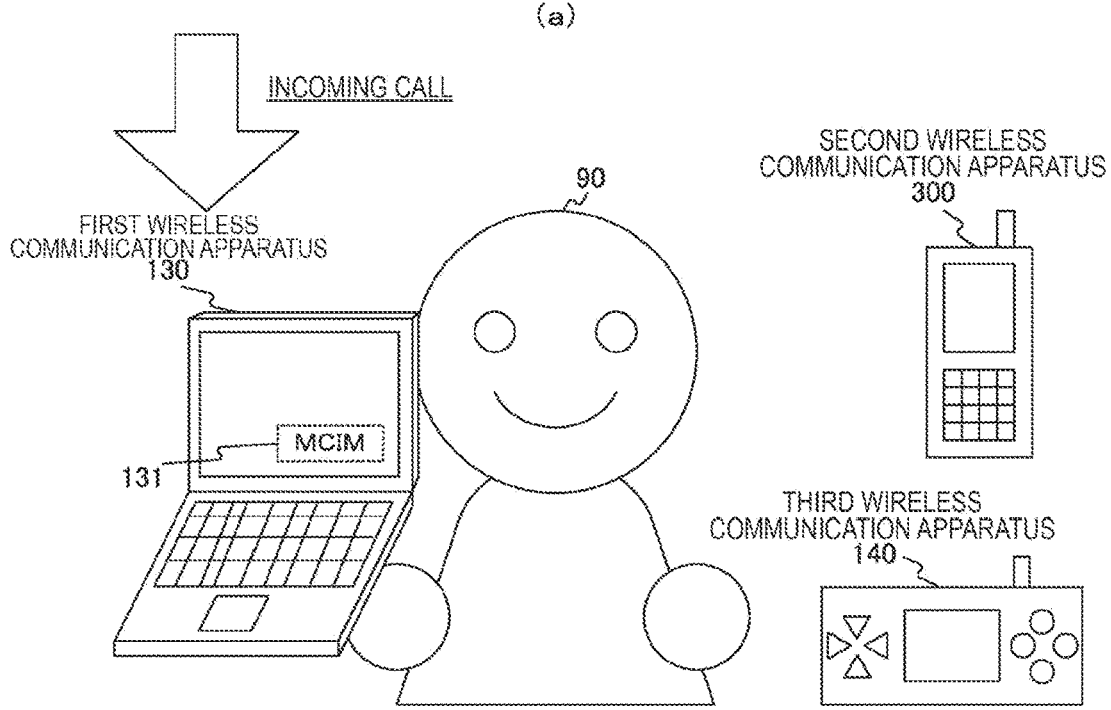
(b)

FIG. 2
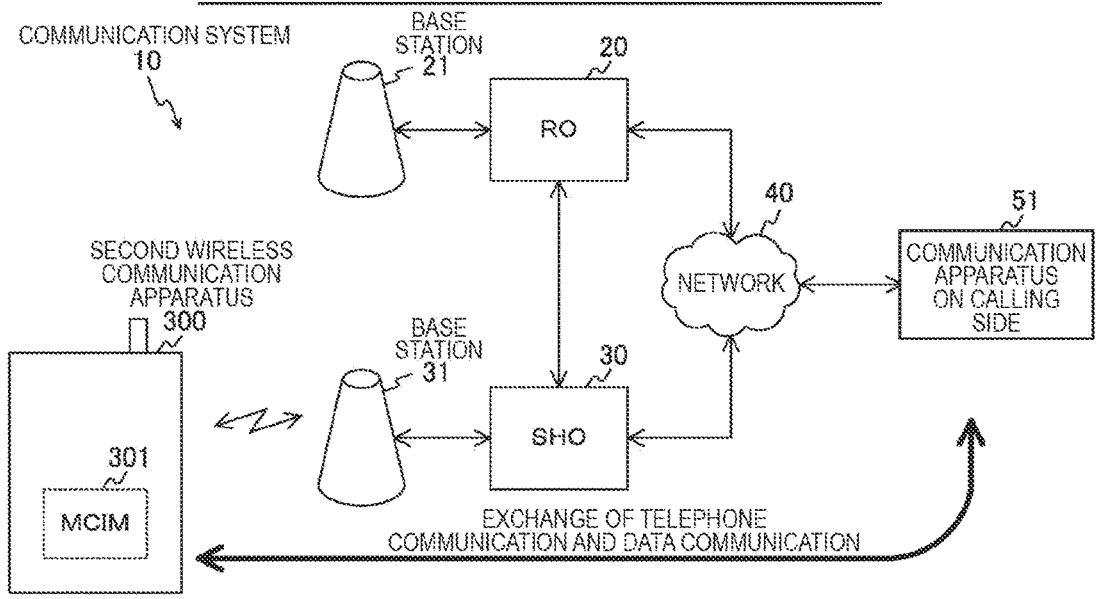
(a)
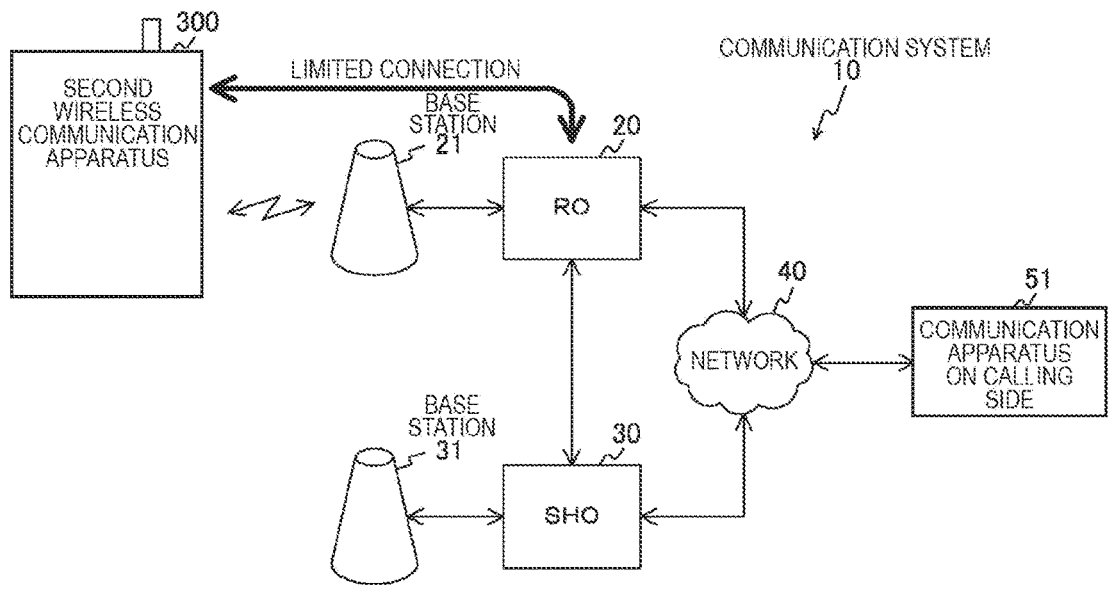
(b)

FIG. 4

| | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 | CALL FUNCTION INFORMATION 227 |
|---|---|---|---|---|---|---|---|
| 1 | GROUP AB | 123456789 | poiuytr | MY COMPUTER | PCID #1 | INVALID | ABSENT |
| | | | | MY MOBILE PHONE | PCID #2 | INVALID | PRESENT |
| | | | | MY GAME | PCID #3 | VALID | ABSENT |
| 2 | ... | ... | ... | ... | ... | ... | ... |
| ... | ... | ... | ... | ... | ... | ... | ... |
| M | ... | ... | ... | ... | ... | ... | ... |

GROUP MANAGEMENT DATABASE 220

FIG. 7
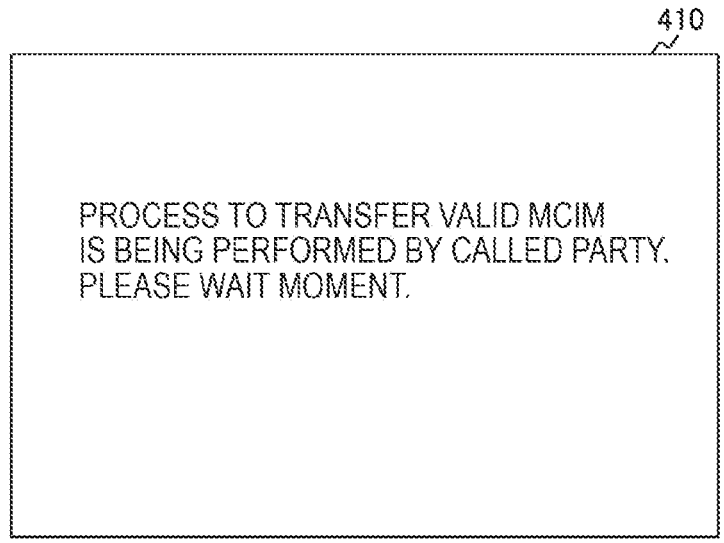
(a)
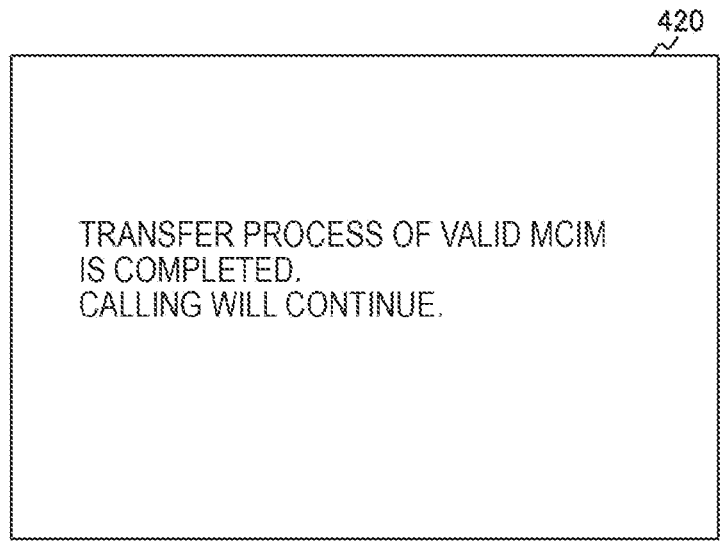
(b)

EXAMPLE OPERATION OF TRANSFER DESTINATION OF MCIM

APPARATUS, SYSTEM AND METHOD FOR NETWORK CONNECTION RIGHT MANAGEMENT

TECHNICAL FIELD

The present technology relates to an information processing apparatus. In particular, the present technology relates to an information processing apparatus, a communication system including such an information processing apparatus, and a control method of the information processing apparatus.

BACKGROUND ART

An expanded functionality is being considered for the 3rd Generation Partnership Project (i.e., 3GPP) that decides the technical specification of public wireless communication networks (see, for example, Non-Patent Literature 1).

Using such an expanded functionality, known as "Machine to Machine Equipment," it will become possible to flexibly use information showing what services can be utilized. Such information may be referred to as contract authentication information (for example, rewritable connection rights). As an example, it may possible to download contract authentication information from a network and additionally or alternatively, to temporarily invalidate and then revalidate contract authentication information within a network.

At present, information corresponding to contract authentication information needs to be stored in a physical device called a SIM (Subscriber Identity Module) card. However, if contract authentication information could be handled as software, the method of storage could be made more flexible.

CITATION LIST

Non-Patent Literature

Non-Patent Literature 1: 3GPP TR 33.812 V9.2.0(2010-06)

SUMMARY OF INVENTION

Technical Problem

By using the expanded functionality described above, it is possible to conceive new methods of using contract authentication information that differ to the past.

For example, sharing contract authentication information among a plurality of wireless communication apparatuses can be assumed. In this case, a case when connection rights are set to a wireless communication apparatus having no call function can be assumed. Thus, when connection rights are set to a wireless communication apparatus having no call function, if there is an incoming call of the phone number related to the connection rights, the call cannot be answered. Thus, when, for example, connection rights are set to a wireless communication apparatus having no specific function (for example, a call function), if an execution request to execute the specific function arises, it is important to allow the specific function to execute appropriately.

The present technology is developed in view of such circumstances and an object thereof is to cause, when connection rights are set to a wireless communication apparatus not equipped with a specific function, the specific function to be executed appropriately in accordance with an execution request to allow the specific function to be executed.

Solution to Problem

The present technology is provided in order to solve the issues mentioned above, and according to a first embodiment of the present technology, there are provided an information processing apparatus, a control method thereof, and a program for causing a computer to execute the method, the information processing apparatus including a receiving unit that receives an execution request to cause a wireless communication apparatus to execute a specific function by using a connection right to connect to a predetermined network using wireless communication. The connection right is set to a first wireless communication apparatus not including the specific function when the execution request is received, and when the connection right is not set to a second wireless communication apparatus including the specific function, the connection right is made to be set to the second wireless communication apparatus to cause the second wireless communication apparatus to execute the specific function in accordance with the execution request. Accordingly, when connection rights are set to a first wireless communication apparatus not equipped with a specific function and connection rights are not set to a second wireless communication apparatus equipped with the specific function, if an execution request to allow the specific function to be executed is received, an operation of causing the second wireless communication apparatus to execute the specific function in accordance with an execution request by causing the connection rights to be set to the second wireless communication apparatus is achieved.

According to the first embodiment of the present technology, the information processing apparatus may be the first wireless communication apparatus. The information processing apparatus may further include a control unit that, when the execution request is received, carries out control to transmit a setting request to cause the connection right to be set to the second wireless communication apparatus to a management system that manages the connection right. Accordingly, when the first wireless communication apparatus receives the execution request, an operation of causing control to transmit a setting request to cause the connection rights to be set to the second wireless communication apparatus to a management system of the connection rights to be carried out is achieved.

According to the first embodiment of the present technology, a group sharing the connection right may include a plurality of wireless communication apparatuses including the information processing apparatus. The control unit may carry out control to identify, among the plurality of wireless communication apparatuses included in the group, a wireless communication apparatus including the specific function as the second wireless communication apparatus. Accordingly, an operation of causing, among a plurality of wireless communication apparatuses forming a group sharing the connection rights, the wireless communication apparatus equipped with the specific function to be identified as the second wireless communication apparatus is achieved.

According to the first embodiment of the present technology, when a plurality of wireless communication apparatuses including the specific function is present, the control unit may carry out control to identify, as the second wireless communication apparatus, one wireless communication apparatus selected from the plurality of wireless communication apparatuses based on a user's operation. Accordingly, when a plurality of wireless communication apparatuses equipped with the specific function is present, an operation of causing one wireless communication apparatus selected from the plurality of wireless communication apparatuses based on a user's operation to be identified is achieved.

According to the first embodiment of the present technology, identification information to identify each of the wireless communication apparatuses included in the group may be stored in an RO (Registration Operator) that manages the group. The control unit may acquire the identification information from the RO to cause a display unit to display a selection screen to select the second wireless communication apparatus from the plurality of wireless communication apparatuses included in the group based on the acquired identification information and carries out control to identify a wireless communication apparatus selected based on a user's operation on the selection screen as the second wireless communication apparatus. Accordingly, an operation of causing a display unit to display a selection screen to select the second wireless communication apparatus based on identification information acquired from RO and causing the wireless communication apparatus selected by a user's operation on the selection screen to be identified as the second wireless communication apparatus is achieved.

According to the first embodiment of the present technology, the management system may be an SHO (Selected Home Operator). The control unit may make the setting request to the SHO. The second wireless communication apparatus may carry out control to execute the specific function using the connection right set by the SHO in accordance with the setting request. Accordingly, an operation of carrying out control to execute the specific function using connection rights set by SHO in accordance with the setting request is achieved.

According to the first embodiment of the present technology, the information processing apparatus may be an information processing apparatus that manages the connection right. The information processing apparatus may further include a control unit that, when the execution request is received, carries out control to cause the second wireless communication apparatus to execute the specific function in accordance with the execution request by causing the connection right to be set to the second wireless communication apparatus. Accordingly, when an information processing apparatus managing connection rights receives an execution request, an operation of causing the second wireless communication apparatus to execute the specific function in accordance with the execution request by causing the connection rights to be set to the second wireless communication apparatus is achieved.

According to the first embodiment of the present technology, when the execution request is received, the control unit may determine whether the specific function is included in a wireless communication apparatus to which the connection right is set and carries out the control based on a determination result. Accordingly, an operation of determining presence/absence of the specific function in the wireless communication apparatus to which connection rights are set and causing control to be carried out based on a determination result is achieved.

According to the first embodiment of the present technology, a group sharing the connection right may include a plurality of wireless communication apparatuses including the first wireless communication apparatus. The control unit may carry out control to identify, among the plurality of wireless communication apparatuses included in the group, a wireless communication apparatus including the specific function as the second wireless communication apparatus. Accordingly, an operation of causing, among a plurality of wireless communication apparatuses forming a group sharing the connection rights, the wireless communication apparatus equipped with the specific function to be identified as the second wireless communication apparatus is achieved.

According to the first embodiment of the present technology, the control unit may identify one wireless communication apparatus selected based on a user's operation as the second wireless communication apparatus. Accordingly, an operation of causing one wireless communication apparatus selected by the user to be identified as the second wireless communication apparatus is achieved.

According to the first embodiment of the present technology, identification information to identify each of the wireless communication apparatuses included in the group may be stored in an RO that manages the group. The control unit may acquire the identification information from the RO to carry out control to transmit the acquired identification information to the first wireless communication apparatus. Accordingly, an operation of causing the first wireless communication apparatus to transmit identification information acquired from RO is achieved.

According to the first embodiment of the present technology, the control unit may carry out control to transmit the acquired identification information as information to cause a display unit of the first wireless communication apparatus to display a selection screen to select the second wireless communication apparatus from the plurality of wireless communication apparatuses included in the group to the first wireless communication apparatus. Accordingly, an operation of causing the display unit of the first wireless communication apparatus to display the selection screen to select the second wireless communication apparatus from the plurality of wireless communication apparatus forming the group based on the identification information is achieved.

According to the first embodiment of the present technology, the specific function may be a call function. Accordingly, an operation of a call function being executed by the second wireless communication apparatus is achieved.

According to the first embodiment of the present technology, the information processing apparatus may be the first wireless communication apparatus. The first wireless communication apparatus may receive the execution request via a data communication function. Accordingly, an operation of an execution request of the call function being received via a data communication function is achieved.

According to the first embodiment of the present technology, the second wireless communication apparatus may be caused to execute the specific function after the connection right set to the first wireless communication apparatus is transferred to the second wireless communication apparatus. Accordingly, an operation of connection rights set to the first wireless communication apparatus being transferred to the second wireless communication apparatus and the specific function being executed by the second wireless communication apparatus is achieved.

According to the first embodiment of the present technology, the second wireless communication apparatus may be caused to execute the specific function by causing a second connection right to be set to the second wireless communication apparatus, the second connection right being a connection right more limited than the connection right set to the first wireless communication apparatus and causing the second wireless communication apparatus to execute the specific function in accordance with the execution request. Accordingly, an operation of second connection rights that are connection rights more limited than the connection rights set to the first wireless communication apparatus to cause the second wireless communication apparatus to execute the specific function in accordance with the execution request being set to the second wireless communication apparatus and the specific function being executed by the second wireless communication apparatus is achieved.

According to the first embodiment of the present technology, the connection right may be a right to connect to a base station based on contract authentication information to connect to the base station operated by a communication operator. Accordingly, an operation of setting rights to connect to a base station based on contract authentication information to connect to the base station operated by a communication operator as the connection rights is achieved.

According to a second embodiment of the present technology, there is provided a communication system including a first wireless communication apparatus as a wireless communication apparatus to which a connection right to connect to a predetermined network using wireless communication is set, the wireless communication apparatus not including a specific function, and a second wireless communication apparatus as a wireless communication apparatus to which the connection right is not set, the wireless communication apparatus including the specific function. The connection right is set to the first wireless communication apparatus when an execution request to cause the wireless communication apparatus to execute the specific function is received, and when the connection right is not set to the second wireless communication apparatus, the connection right is made to be set to the second wireless communication apparatus to cause the second wireless communication apparatus to execute the specific function in accordance with the execution request. Accordingly, if connection rights are set to a first wireless communication apparatus and connection rights are not set to a second wireless communication apparatus when an execution request to cause a wireless communication apparatus to execute a specific function, an operation of causing the second wireless communication apparatus to execute the specific function in accordance with the execution request by causing the connection rights to be set to the second wireless communication apparatus is achieved.

Advantageous Effects of Invention

According to the present technology, an advantageous effect of being able to cause, when connection rights are set to a wireless communication apparatus not equipped with a specific function, the specific function to be executed appropriately in accordance with an execution request to allow the specific function to be executed can be achieved.

BRIEF DESCRIPTION OF DRAWINGS

FIG. 1 is a simplified diagram showing one example usage of a plurality of wireless communication apparatus (devices) according to a first exemplary embodiment.

FIG. 2 is a block diagram showing an exemplary system configuration of a communication system 10, according to the first exemplary embodiment.

FIG. 4 is a schematically diagram of a group management database 220, according to the first exemplary embodiment.

FIG. 7 is a diagram showing exemplary displays of two screens displayed in a communication apparatus 150 on a calling side, according to the first exemplary embodiment.

DESCRIPTION OF EMBODIMENTS

Figure 3:
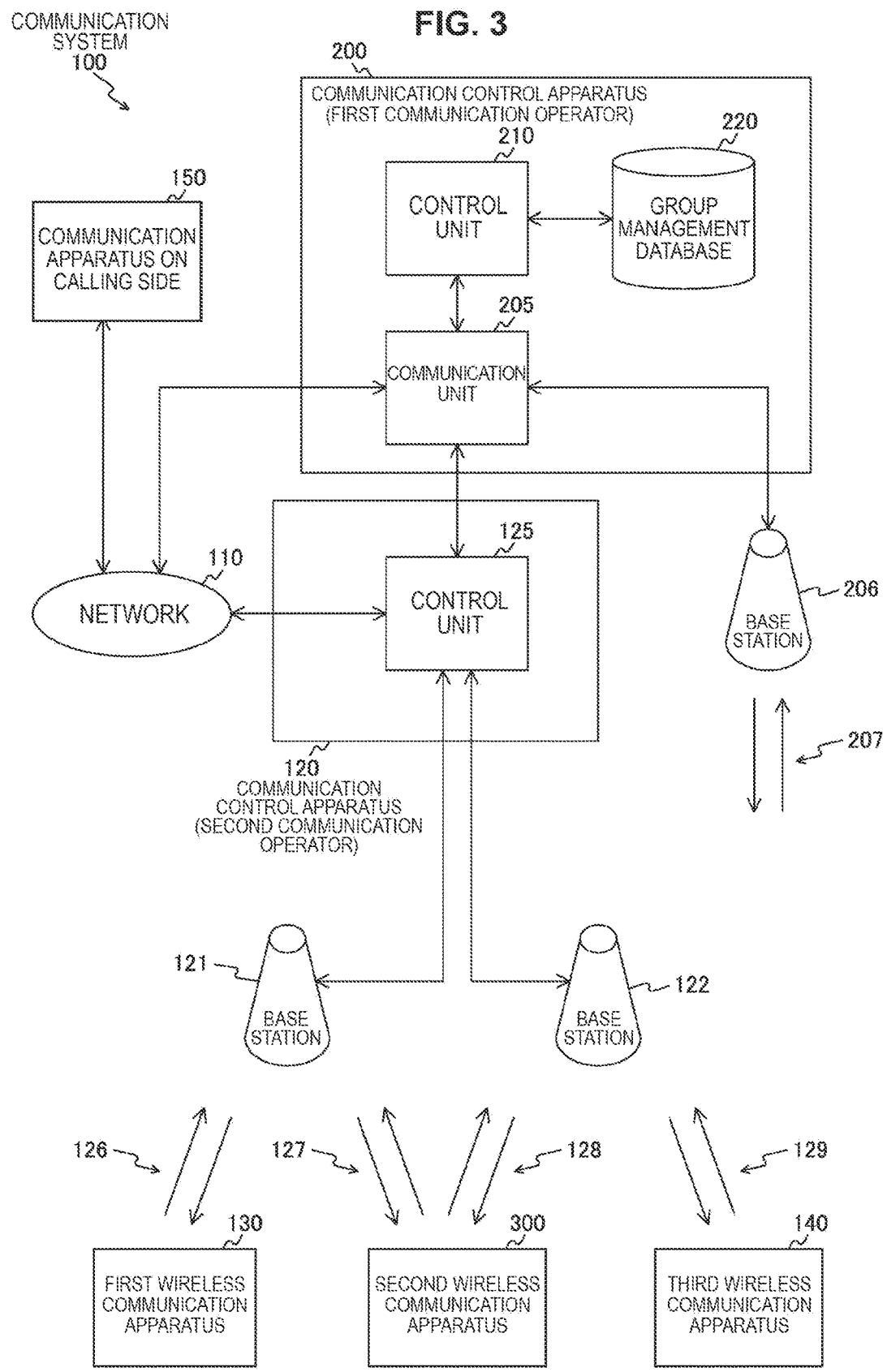
FIG. 3 is a block diagram showing an exemplary system configuration of a communication system 100, according to the first exemplary embodiment.

Forms to carry out the present technology (hereinafter, called embodiments) will be described below. The description will be provided in the following order:

1. First embodiment (communication control: an example in which the first wireless communication apparatus 300 decides the transfer destination of MCIM based on group information)
2. Second embodiment (communication control: an example in which SHO decides the transfer destination of MCIM based on group information)
3. Third embodiment (communication control: an example in which temporary contract authentication information is set)

1. First Embodiment

[Example Usage of Wireless Communication Apparatus]

FIG. 1 is a simplified diagram showing one example usage of a plurality of wireless communication apparatuses (devices) according to the first embodiment of the present technology.

In FIG. 1, a state in which a user 90 uses a plurality of wireless communication apparatuses (the first wireless communication apparatus 130, the second wireless communication apparatus 300, and a third wireless communication apparatus 140) is described. The first wireless communication apparatus 130 is, for example, a notebook personal computer, the second wireless communication apparatus 300 is, for example, a mobile phone, and the third wireless communication apparatus 140 is, for example, a mobile game machine capable of using wireless communication. It is assumed that the wireless communication apparatus 130 and the third wireless communication apparatus 140 are not equipped with the call function.

FIG. 1(a) shows a state in which the user 90 uses the first wireless communication apparatus 130 to which a valid MCIM is set.

The MCIM is an example of contract authentication information and the contract authentication information is information including subscriber information of the telephone and information of authentication. The MCIM is contract authentication information (so-called soft SIM (Subscriber Identity Module)) that is not limited to a specific communication operator when, for example, a device is purchased and allows the user to flexibly set the communication operator after the purchase. A case when no valid MCIM is held means, for example a case when MCIM itself is not held or only MCIM invalidated by an invalidation process of MCIM is held. Hereinafter, the valid MCIM will be referred to as simply the MCIM.

In the state shown in FIG. 1(a), the first wireless communication apparatus 130 to which MCIM (MCIM 131) is set can perform data communication via a specific communication operator. On the other hand, the second wireless communication apparatus 300 and the third wireless communication apparatus 140 to which no MCIM is set cannot perform data communication via a specific communication operator.

FIG. 1(b) shows a state in which there is an incoming call of the phone number identified by the MCIM 131 when the MCIM (the MCIM 131) is set to the first wireless communication apparatus 130. Because the first wireless communication apparatus 130 is not equipped with the call function, the call cannot be answered.

Thus, if there is an incoming call when MCIM is set to an apparatus (the first wireless communication apparatus 130 and the third wireless communication apparatus 140) that cannot make a call, the call cannot be answered. Therefore, in the first embodiment, an example in which when there is an incoming call to a wireless communication apparatus not equipped with the call function and to which MCIM is set, the incoming call is answered by transferred to the MCIM to a wireless communication apparatus equipped with the call function is shown.

[Example Configuration of Communication System]

FIG. 2 is a block diagram showing an exemplary system configuration of the communication system 10 according to the first embodiment of the present technology. In FIG. 2, an exemplary configuration of a communication system assuming a network configuration including SHO (Selected Home Operator) and RO (Registration Operator) is shown (see, for example, Non-Patent Literature 1).

FIG. 2(a) shows a wireless communication example when the second wireless communication apparatus 300 holds a valid MCIM (an MCIM 301). FIG. 2(b) shows a wireless communication example when the second wireless communication apparatus 300 holds no valid MCIM (MCIM 301) (no MCIM is set).

The communication system 10 includes RO 20, SHO 30, base stations 21, 31, a network 40, a communication apparatus 51 on the calling side, and the second wireless communication apparatus 300.

Here, RO and SHO show logical roles and a case in which RO and SHO are operated by different operators can be assumed, but also a case in which RO and SHO are operated by the same operator can be assumed. In addition, a case in which a plurality of RO or a plurality of SHO is present can be assumed. Each of RO and SHO may be configured integrally as an information processing apparatus or constituted of a plurality of apparatuses. Here, RO and SHO mean relative roles when a wireless communication apparatus having a valid MCIM is used as a reference. Thus, there is a possibility that RO for one wireless communication apparatus corresponds SHO for another wireless communication apparatus.

When, as shown in FIG. 2(a), the second wireless communication apparatus 300 holds a valid MCIM (the MCIM 301), the second wireless communication apparatus 300 can be connected to the SHO 30 via the base station 31 based on the MCIM 301. When, as shown in FIG. 2(b), the second wireless communication apparatus 300 holds no valid MCIM (the MCIM 301), by contrast, the second wireless communication apparatus 300 cannot be connected to the SHO 30. In this case, however, the second wireless communication apparatus 300 can be connected to the RO 20 via the base station 21 based on PCID (Provisional Connectivity Identity).

PCID is an identifier (for example, terminal identification information 225 in a network shown in FIG. 4) to connect to RO and is attached to all wireless communication apparatuses (devices) having a mechanism of software downloadable SIM.

The network 40 is a network (for example, a public network) such as a telephone network and the Internet. The network 40 and the SHO 30 are connected via a gateway (not shown). Similarly, the network 40 and the RO 20 are connected via a gateway (not shown).

The RO 20 is a communication control apparatus managed by a wireless operator providing services such as initial connection registration. The RO 20 corresponds to, for example, a wireless operator (for example, a mobile phone operator) providing wireless connection services. The RO 20 includes a control unit (not shown).

The control unit of the RO 20 carries out authentication control of a wireless communication apparatus connected via the base station 21. For example, the control unit of the RO 20 performs authentication based on PCID of a wireless communication apparatus connected via the base station 21. Then, the RO 20 provides services such as initial connection registration to the authenticated wireless communication apparatus. The control unit of the RO 20 is connected to SHO 30 to exchange various kinds of information with the SHO 30.

The base station 21 is a mobile communication base station (NodeB) that connects the second wireless communication apparatus 300 and the RO 20 via a wireless line.

The SHO 30 is a communication control apparatus managed by a wireless operator providing wireless connection services. The SHO 30 provides Internet services and the like and corresponds to, for example, a wireless operator (for example, a mobile phone operator) providing wireless connection services. The SHO 30 includes a control unit (not shown).

The control unit of the SHO 30 carries out authentication control of a wireless communication apparatus connected via the base station 31. For example, among wireless communication apparatuses connected via the base station 31, the control unit of the SHO 30 authenticates wireless communication apparatuses having a valid MCIM (contract authentication information) of the SHO 30. Then, the SHO 30 connects authenticated wireless communication apparatuses to the network 40 via a gateway (not shown).

The control unit of the SHO 30 is connected to RO 20 to exchange various kinds of information with the RO 20. A wireless communication apparatus holding no valid MCIM (contract authentication information) can be connected (limited connection) to the RO 20 via the SHO 30 based on PCID of the wireless communication apparatus.

The base station 31 is a mobile communication base station (NodeB) that connects the second wireless communication apparatus 300 and the SHO 30 via a wireless line.

The communication apparatus 51 on the calling side is a communication apparatus that submits a call (outgoing call) to the phone number identified by a valid MCIM (the MCIM 301). The communication apparatus 51 on the calling side is connected to the SHO 30 via the network 40.

When, for example, as shown in FIG. 2(a), the second wireless communication apparatus 300 holds the valid MCIM 301, the second wireless communication apparatus 300 is connected to the base station 31 via a wireless line based on the MCIM 301 and connected to the SHO 30 via the base station 31. In this case, the second wireless communication apparatus 300 is connected to the SHO 30 via the base station 31 and can answer a phone call (incoming call) from the communication apparatus 51 on the calling side. In addition, the second wireless communication apparatus can receive provision of various services (for example, content downloading) via the network 40 by being connected to the SHO 30. When the wireless communication apparatus 300 holding the valid MCIM 301 is connected to the RO 20, the wireless communication apparatus is connected to the RO 20 via the SHO 30.

When, as shown in FIG. 2(b), the wireless communication apparatus 300 does no hold the valid MCIM 301, the wireless communication apparatus 300 can be connected (limited connection) to the RO 20 via the base station 21 based on held PCID. In this case, the wireless communication apparatus 300 is connected (limited connection) to the RO 20 via the base station 21, but can perform only limited communication (for example, downloading of an MCIM and validation/invalidation of an MCIM).

When the wireless communication apparatus 300 does not hold the valid MCIM 301, the wireless communication apparatus 300 can be connected to any of the base stations 21, 31 depending on the position of use and can be connected to the RO 20 via these base stations.

Therefore, the wireless communication apparatus 300 that does not hold the valid MCIM 301 cannot receive an incoming call from the communication apparatus 51 on the calling side. That is, a wireless communication apparatus holding no MCIM can be grasped as a device (RO Connected Device) connected with limited services. In contrast, a wireless communication apparatus holding an MCIM can be grasped as a service connected (normal connection) device (SHO Connected Device). A wireless communication apparatus holding no MCIM can connect to the SHO 30 by acquiring an MCIM (for example, downloading an MCIM or validating an MCIM) via the RO 20. This also applies to the first wireless communication apparatus 130 and the third wireless communication apparatus 140, but these apparatuses do not have the call function and so cannot submit and terminate a call.

[Example Configuration of Communication System]

FIG. 3 is a block diagram showing an example of the system configuration of a communication system 100 according to the first embodiment of the present technology.

The communication system 100 includes a network 110, base stations 121, 122, 206, the first wireless communication apparatus 130, the second wireless communication apparatus 300, and the third wireless communication apparatus 140. The communication system 100 also includes a communication control apparatus (second communication operator) 120, a communication control apparatus (first communication operator) 200, and the communication apparatus 150 on the calling side.

The communication system 100 is a system corresponding to the communication system 10 shown in FIG. 2. More specifically, the communication control apparatus (second communication operator) 120 corresponds to the SHO 30 shown in FIG. 2 and the communication control apparatus (first communication operator) 200 corresponds to the RO 20 shown in FIG. 2. Thus, in this example, a portion of the description of units common to those of the communication system 10 shown in FIG. 2 is omitted.

The network 110 is a network (for example, a public network) such as a telephone network and the Internet. The network 110 and the communication control apparatus (second communication operator) 120 are connected via a gateway (not shown). Similarly, the network 110 and the communication control apparatus (first communication operator) 200 are connected via a gateway (not shown).

The communication control apparatus (second communication operator) 120 is a communication control apparatus managed by a wireless operator providing wireless connection services and corresponds to the SHO 30 shown in FIG. 2. That is, the communication control apparatus (second communication operator) 120 provides Internet services and the like and corresponds to, for example, a wireless operator (for example, a mobile phone operator) providing wireless connection services. The communication control apparatus 120 includes a control unit 125.

The control unit 125 carries out authentication control of wireless communication apparatuses connected via the base stations 121, 122. For example, among wireless communication apparatuses connected via the base stations 121, 122, the control unit 125 authenticates wireless communication apparatuses having a valid MCIM (contract authentication information) of the communication control apparatus (second communication operator) 120. Then, the communication control apparatus 120 connects authenticated wireless communication apparatuses to the network 110 via a gateway (not shown).

In addition, the control unit 125 is connected to the communication control apparatus (first communication operator) 200 to exchange various kinds of information with the communication control apparatus (first communication operator) 200. A wireless communication apparatus holding no valid MCIM (contract authentication information) can be connected (limited connection) to the communication control apparatus (first communication operator) 200 via communication control apparatus (second communication operator) 120 based on PCID of the wireless communication apparatus. When a transfer request of MCIM is received from a wireless communication apparatus, the control unit 125 transmits the transfer request to the communication control apparatus (first communication operator) 200.

The base stations 121, 122 are mobile communication base stations (NodeB) that connect the first wireless communication apparatus 130, the second wireless communication apparatus 300, and the third wireless communication apparatus 140, and the communication control apparatus (second communication operator) 120 via wireless lines.

For example, in the communication system 100, a wireless communication apparatus holding a valid MCIM is connected to the base stations 121, 122 via wireless lines before being connected to the communication control apparatus (second communication operator) 120 via the base stations 121, 122. When a wireless communication apparatus holding a valid MCIM is connected to the communication control apparatus (first communication operator) 200, the wireless communication apparatus is connected to the communication control apparatus (first communication operator) 200 via the communication control apparatus (second communication operator) 120.

A wireless communication apparatus holding no valid MCIM can be connected (limited connection) to the communication control apparatus (first communication operator) 200 via the base station 206 based on PCID of the wireless communication apparatus. A wireless communication apparatus holding no valid MCIM can be connected to any of the base stations 121, 122, 206 depending on the position of use and can be connected to the communication control apparatus (first communication operator) 200 via these base stations.

The communication control apparatus (first communication operator) 200 is a communication control apparatus managed by a wireless operator providing services such as initial connection registration and corresponds to the RO 20 shown in FIG. 2. The communication control apparatus (first communication operator) 200 corresponds to, for example, a wireless operator (for example, a mobile phone operator) providing wireless connection services. The communication control apparatus (first communication operator) 200 includes a communication unit 205, a control unit 210, and a group management database 220.

The communication unit 205 transmits and receives various kinds of information based on the control of the control unit 210. The communication unit 205 is connected to, for example, the communication control apparatus (second communication operator) 120 and the base station 206 and transmits and receives various kinds of information to/from each wireless communication apparatus connected via these units.

The control unit 210 carries out various kinds of control of a wireless communication apparatus connected via the communication unit 205 (or via the communication unit 205 and the communication control apparatus (second communication operator) 120). For example, the control unit 210 acquires information (group information) about a group formed of a plurality of wireless communication apparatuses sharing an MCIM from the group management database 220 and supplies the group information to the wireless communication apparatuses via the communication unit 205 and the communication control apparatus (second communication operator) 120.

By transferring an MCIM between a plurality of wireless communication apparatuses, the MCIM can be shared among the plurality of wireless communication apparatuses. In this case, the plurality of wireless communication apparatuses related to the sharing can be set as a group. The group can be managed by the group management database 220.

The group is a group that shares connection rights (network connection rights). The connection rights are rights to connect to a predetermined network (for example, the network 110) using wireless communication and corresponds to, for example, use rights over MCIM. That is, connection rights are rights to connect to a base station based on an MCIM (contract authentication information) to connect to the base station operated by a communication operator. In addition, presence/absence of connection rights corresponds to presence/absence of use rights over MCIM.

The group management database 220 is a database to manage groups constituted of a plurality of wireless communication apparatuses sharing MCIM. The group management database 220 will be described in detail with reference to FIG. 4.

The communication apparatus 150 on the calling side is a communication apparatus that submits a call (outgoing call)

to the phone number identified by an MCIM and corresponds to the communication apparatus 51 on the calling side in FIG. 2.

For example, the control unit 125 receives a calling (execution request) of the call function (specific function) that becomes executable by holding an MCIM (connection rights to connect to a predetermined network using wireless communication). Then, if the control unit 125 detects that an MCIM is set to a wireless communication apparatus not equipped with the call function and no MCIM is set to a wireless communication apparatus equipped with the call function, the control unit sets the MCIM to the wireless communication apparatus equipped with the call function. Then, the control unit 125 causes the wireless communication apparatus equipped with the call function to execute the call function.

[Example Configuration of Group Management Database]

FIG. 4 is a schematically diagram of a group management database 220, according to the first exemplary embodiment.

FIG. 4 shows a case when the first wireless communication apparatus 130, the second wireless communication apparatus 300, and the third wireless communication apparatus 140 are entered in a group AB.

In the group management database 220, a group name 221, a group ID 222, a group password 223, a device name 224, terminal identification information 225, valid/invalid information 226, and call function information 227 are stored so as to be associated with one another in group units. Such information is successively updated by the control unit 210 based on requests (group addition requests, group deletion requests) from the respective wireless communication apparatuses, for example.

A name assigned to a group is stored in the group name 221. Such name is stored for example when a group is generated.

A group ID assigned to a group is stored in the group ID 222. A password assigned to a group is stored in the group password 223. A group addition request for adding a new wireless communication apparatus to the group is made using such ID and password. The respective wireless communication apparatuses belonging to a group may store in advance the ID and password assigned to such group (for example, storage in a memory 340 shown in FIG. 5). Alternatively, an arrangement may be used where the ID and password are not stored in a wireless communication apparatus and are inputted each time by the user.

Names assigned to devices are stored in the device name 224. As one example, such names are stored when devices are newly added to a group of wireless communication apparatuses.

Terminal identification numbers of wireless communication apparatuses (devices) are stored in the terminal identification information 225. Terminal identification information is identification information for identifying a wireless communication apparatus, and as one example a PCID is stored. In FIGS. 4(*a*) and 4(*b*), "PCID#1" in the terminal identification information 225 corresponds to the first wireless communication apparatus 130. In the same way, "PCID#2" in the terminal identification information 225 corresponds to the second wireless communication apparatus 300 and "PCID#3" in the terminal identification information 225 corresponds to the third wireless communication apparatus 140.

Information showing whether the MCIM at the wireless communication apparatus is valid or invalid (or an MCIM is yet to be stored) is stored in the valid/invalid information 226. Note that in FIG. 4(*a*), for ease of explanation, a wireless communication apparatus where the MCIM is valid is shown as "valid" and a wireless communication apparatus where the MCIM is invalid is shown as "invalid".

Call function information 227 stores information about presence/absence of the call function in a wireless communication apparatus. In FIG. 4, "Present" is shown for a wireless communication apparatus equipped with the call function and "Absent" is shown for a wireless communication apparatus having no call function for the simplification of description.

In this manner, groups formed of a plurality of wireless communication apparatuses sharing an MCIM are managed in the group management database 220. In the first embodiment of the present technology, it is assumed that a transfer process of MCIM is performed between wireless communication apparatuses belonging to the same group.

The entry of a wireless communication apparatus in a group will be described. For example, by performing an addition/entry operation of a new wireless communication apparatus to be added, the new wireless communication apparatus can be added and entered in the group. In this case, a new wireless communication apparatus may be added and entered in the group on condition that an approval operation of the addition/entry is performed by one or a plurality of wireless communication apparatuses (that are already entered in the group) other than the new wireless communication apparatus.

In the embodiments of the present technology, examples in which one MCIM is shared in a group constituted of a plurality of wireless communication apparatuses are shown for the simplification of the description. However, the present technology can similarly be applied when N MCIM (M>N) are shared in a group constituted of M wireless communication apparatuses.

[Example Configuration of Wireless Communication Apparatus]

Figure 5:
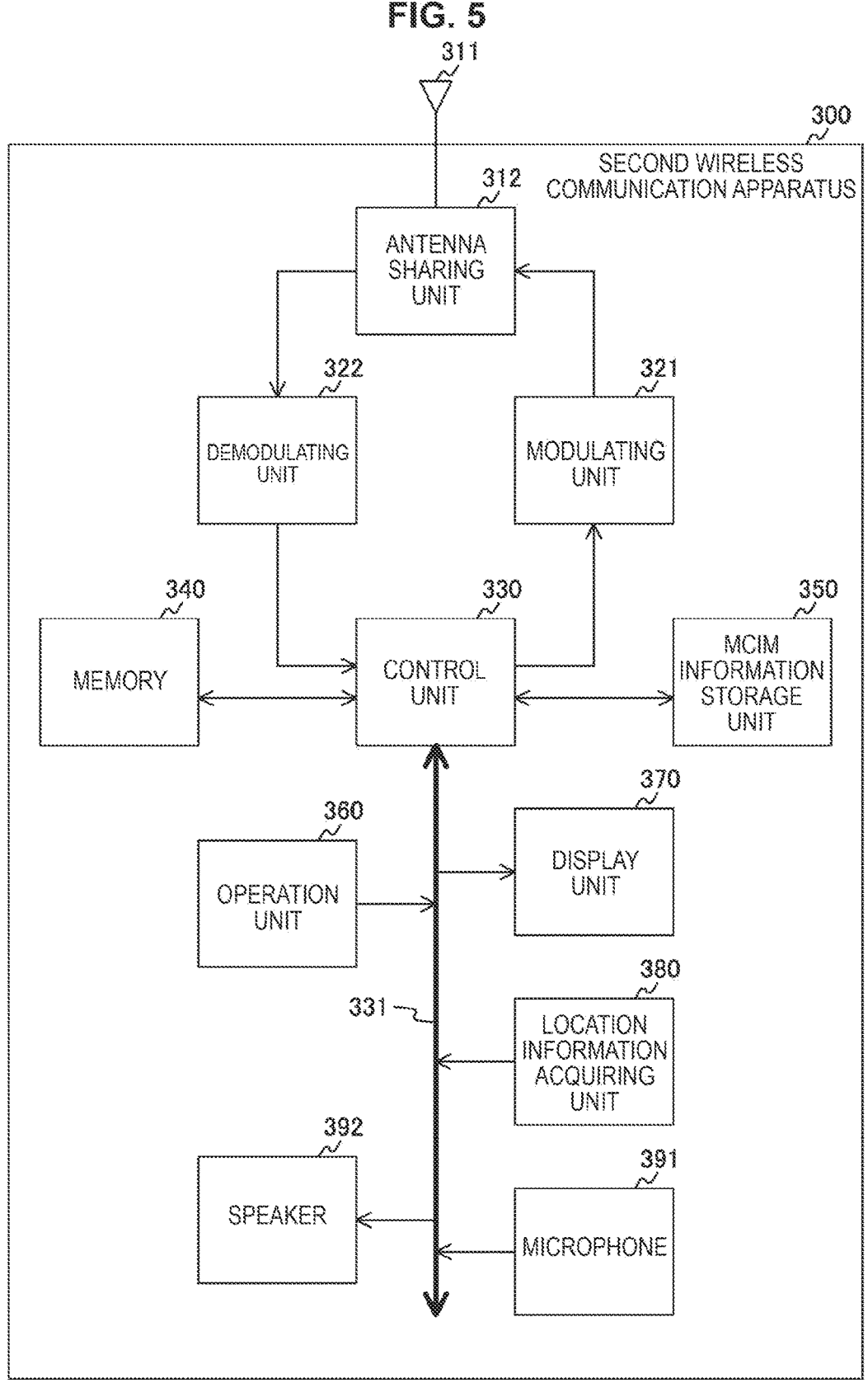
FIG. 5 is a block diagram showing an exemplary internal configuration of a second wireless communication apparatus 300, according to the first exemplary embodiment.

FIG. 5 is a block diagram showing an example of the internal configuration of the second wireless communication apparatus 300 according to the first embodiment of the present disclosure. Note that the internal configurations of the first wireless communication apparatus 130 and the third wireless communication apparatus 300 will be described with reference to FIG. 6

The second wireless communication apparatus 300 includes an antenna 311, an antenna sharing unit 312, a modulating unit 321, a demodulating unit 322, a control unit 330, a memory 340, and the MCIM information storage unit 350. The second wireless communication apparatus 300 also includes an operation unit 360, a display unit 370, a location information acquiring unit 380, a microphone 391, and a speaker 392. Such components are connected by a bus 331. As one example, the second wireless communication apparatus 300 is realized by a mobile telephone apparatus capable of telephone calls and data communication.

For example, when a reception process is carried out, radio waves received by the antenna 311 are demodulated via the antenna sharing unit 312 by the demodulating unit 322 and demodulated reception data is supplied to the control unit 330. When the reception process is an incoming call process, the demodulated reception data (audio data) is outputted via the control unit 330 from the speaker 392 as sound.

When, for example, a transmission process is carried out, the transmission data outputted by the control unit 330 is modulated by the modulating unit 321 and the modulated transmission data is transmitted via the antenna sharing unit 312 from the antenna 311. When the transmission process is an outgoing call process, audio data inputted from the microphone 391 is modulated via the control unit 330 by the modulating unit 321 and modulated transmission data (audio data) is transmitted via the antenna sharing unit 312 from the antenna 311.

The control unit 330 carries out various control based on a control program stored in the memory 340. As one example, the control unit 330 is constructed of a microprocessor. For example, the control unit 330 is connected to the modulating unit 321 and the demodulating unit 322 and transmits and receives various data to and from the communication control apparatus (second communication operator) 120 connected via the base stations 121, 122. The control unit 330 also carries out a connection process that connects to the communication control apparatus (first communication operator) 200 (with a limited connection) via a wireless connection based on the PCID, for example, without using the MCIM.

The memory 340 is a memory storing a control program for enabling the control unit 330 to carry out various controls, in addition to transmission data, reception data, and the like. As examples, the memory 340 is constructed of ROM (Read Only Memory) and/or RAM (Random Access Memory). Terminal identification information (PCID#1) for specifying the first wireless communication apparatus 300 and a device name (for example, the device name 224 shown in FIG. 4(a)) of the first wireless communication apparatus 300 are also stored in the memory 340. Such device name is registered for example by a user operation. The ID and password assigned to the group AB to which the first wireless communication apparatus 300 belongs (as one example, the group ID 222 and the group password 223 shown in FIG. 4(a)) are also stored in the memory 340. As one example, such group ID and password are included in a group addition authentication result given in response to a group addition request, transmitted from the communication control apparatus (first communication operator) 200, and stored in the memory 340.

The MCIM information storage unit 350 is a memory storing an MCIM (contract authentication information). As the MCIM information storage unit 350, as examples it is possible to use a UICC (Universal Integrated Circuit) card or a dedicated memory for securely storing an MCIM. Note that when a UICC card is used as the MCIM information storage unit 350, instead of the MCIM being permanently written, a card capable of a validation process and an invalidation process for the MCIM is used. That is, a device that enables the control unit 330 to carry out a validation process and an invalidation process for an MCIM based on transfer information that has been received from the antenna 311 and demodulated is used. Also, a device that allows the MCIM to be rewritten is used. Note that the validation process and invalidation process for the MCIM can be carried out according to the validation process and invalidation process defined by 3GPP (Third Generation Partnership Project). Also, by providing a secure region in the memory 340, the MCIM information storage unit 350 may be provided inside the memory 340.

The operation unit 360 is an operation accepting unit accepting operation input operated by the user and outputs a signal to a control unit 330 in accordance with the accepted operation input. The operation unit 360 includes various keys such as numeric keys and alphabetical keys, and accepts an instruction operation (predetermined operation) by the user to instruct a group addition request.

The display unit 370 is a display unit displaying various kinds of information (character information, time information and the like) based on the control of the control unit 330. As the display unit 370, for example, a display panel such as an organic EL (Electro Luminescence) panel, an LCD (Liquid Crystal Display) panel or the like can be used. The operation unit 360 and the display unit 370 can integrally be configured by using a touch panel on which the user can do operation input by touching a display surface with a user's finger or bringing a user's finger closer to the display surface.

The location information acquiring unit 380 acquires location information showing the location where the second wireless communication apparatus 300 is present and outputs the acquired location information to the control unit 330. As one example, the location information acquiring unit 380 can be realized by a GPS (Global Positioning System) unit that calculates the location information using GPS signals received by a GPS signal reception antenna (not shown). The calculated location information includes various data relating to location, such as latitude, longitude, and altitude, at the time the GPS signals were received. It is also possible to use a location information acquiring apparatus acquiring location information according to a different method of acquiring location information. For example, it is possible to derive location information using access point information according to a wireless LAN (Local Area Network) present in the periphery and to use a location information acquiring apparatus that acquires such location information.

[Example Configuration of Wireless Communication Apparatus]

Figure 6:
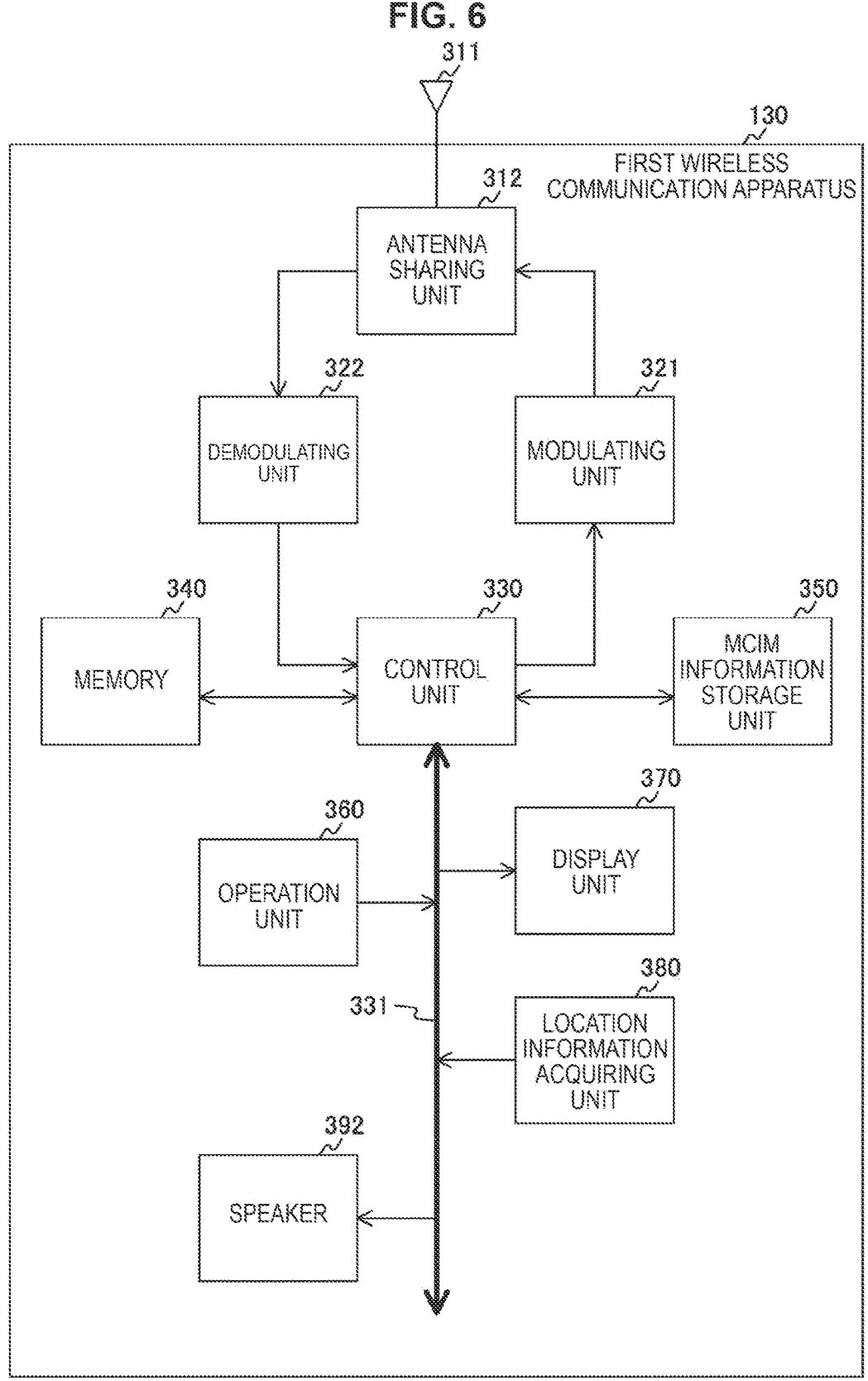
FIG. 6 is a block diagram showing an exemplary internal configuration of a first wireless communication apparatus 130, according to the first exemplary embodiment.

FIG. 6 is a block diagram showing an example of the internal configuration of the first wireless communication apparatus 130 according to the first embodiment of the present technology.

In FIG. 6, an example of the internal configuration is shown by focusing on the wireless communication function included in the first wireless communication apparatus 130. The internal configuration of the third wireless communication apparatus 140 is like that of the first wireless communication apparatus 130 and thus, the internal configuration of the first wireless communication apparatus 130 is described here and the description of the internal configuration of the third wireless communication apparatus 140 is omitted. In FIG. 6, the same reference signs as those in FIG. 5 are attached to components having the same internal configuration as that of the second wireless communication apparatus 300 shown in FIG. 5 and the description thereof here is omitted.

The first wireless communication apparatus 130 includes the antenna 311, the antenna sharing unit 312, the modulating unit 321, the demodulating unit 322, a control unit 330, the memory 340, and the MCIM information storage unit 350. The first wireless communication apparatus 300 also includes the operation unit 360, the display unit 370, the location information acquiring unit 380, and the speaker 392. Such components are connected by the bus 331. On the other hand, the first wireless communication apparatus 130 does not include the call function and the microphone 391 (shown in FIG. 5).

The wireless communication apparatus (the first wireless communication apparatus 130 and the third wireless communication apparatus 140) that does not include the call function and the microphone 391 as described above cannot be used to make a call.

It is assumed here, for example, that an execution request (incoming call information) to execute a specific function (call function) by using connection rights (use rights over MCIM) to connect to a predetermined network using wireless communication is received. In this case, the control unit 330 causes a wireless communication apparatus (the second wireless communication apparatus 300) equipped with the call function to set an MCIM and transmits a request (transfer setting information) to cause the wireless communication apparatus to execute the call function.

The control unit 330 also identifies, among wireless communication apparatuses belonging to the same group, those wireless communication apparatuses equipped with the call function as wireless communication apparatuses caused to set an MCIM. The control unit 330 is an example of a control unit described in claims. The antenna 311, the antenna sharing unit 312, and the demodulating unit 322 are examples of a receiving unit described in claims.

[Example Display of Screen in Communication Apparatus on Calling Side]

FIG. 7 is a diagram showing example displays of two screens displayed in the communication apparatus 150 on the calling side according to the first embodiment of the present technology. The communication apparatus 150 on the calling side (shown in FIG. 3) is assumed to be the apparatus that has submitted calling of a call (outgoing call) to the phone number identified by the MCIM included in the first wireless communication apparatus 130.

FIG. 7(a) shows a screen displayed, when an MCIM is transferred from a wireless communication apparatus having no call function to a wireless communication apparatus having the call function, in the communication apparatus 150 on the calling side until the transfer is completed. The screen (wait request display screen 410) shown in FIG. 7(a) is a screen to notify that an MCIM is being transferred based on calling of a call made by the communication apparatus 150 on the calling side. That is, the control unit 125 of the communication control apparatus (second communication operator) 120 causes the communication apparatus 150 on the calling side to display the wait request display screen 410. Accordingly, the user of the communication apparatus 150 on the calling side is notified that a little time is needed for calling to prevent the user from stopping calling during a transfer process of MCIM.

FIG. 7(b) shows a screen displayed, when an MCIM is transferred from a wireless communication apparatus having no call function to a wireless communication apparatus having the call function, in the communication apparatus 150 on the calling side after the transfer is completed. The screen (transfer completion notification screen 420) is a screen to notify that the transfer of the MCIM performed based on calling of a call made by the communication apparatus 150 on the calling side is completed. That is, the user can be notified that the called party will soon answer the call by the communication apparatus 150 on the calling side being caused to display the wait request display screen 410 by the control unit 125 of the communication control apparatus (second communication operator) 120.

[Example Display of Transfer Setting Screen in First Wireless Communication Apparatus]

Figure 8:
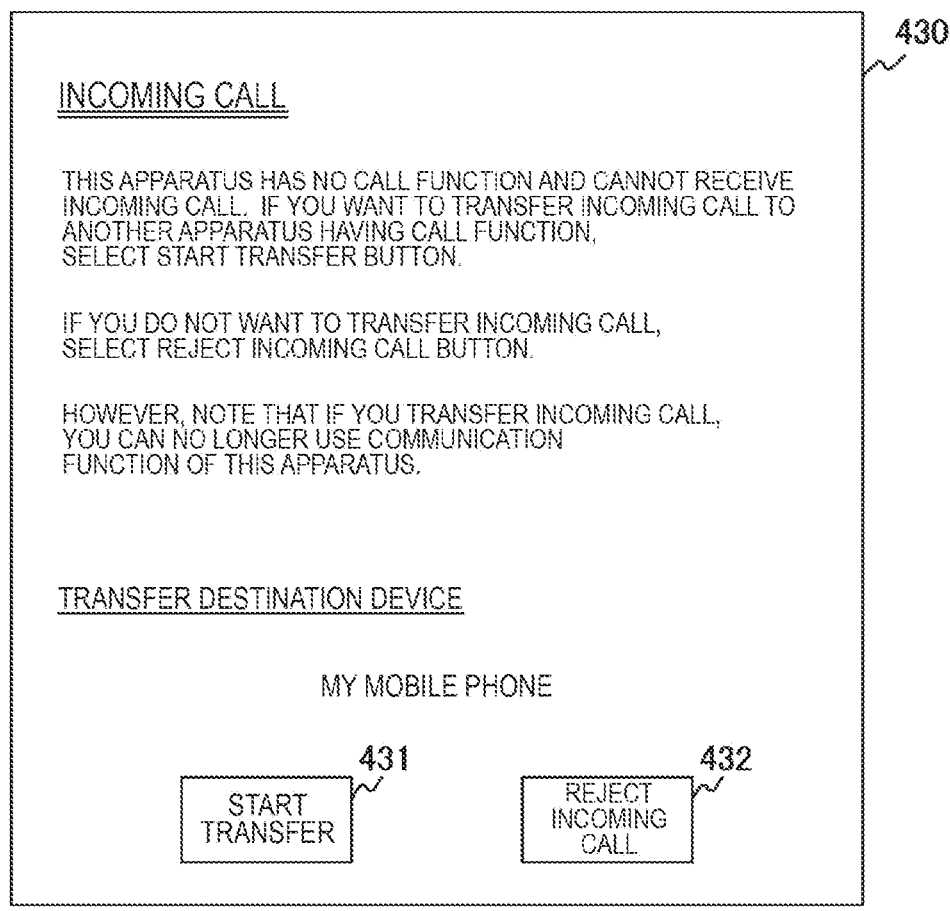
FIG. 8 is a diagram showing an exemplary display of display screens (transfer setting screens 430, 440) displayed in a display unit 370 of the first wireless communication apparatus 130, according to the first exemplary embodiment.
Figure 9:
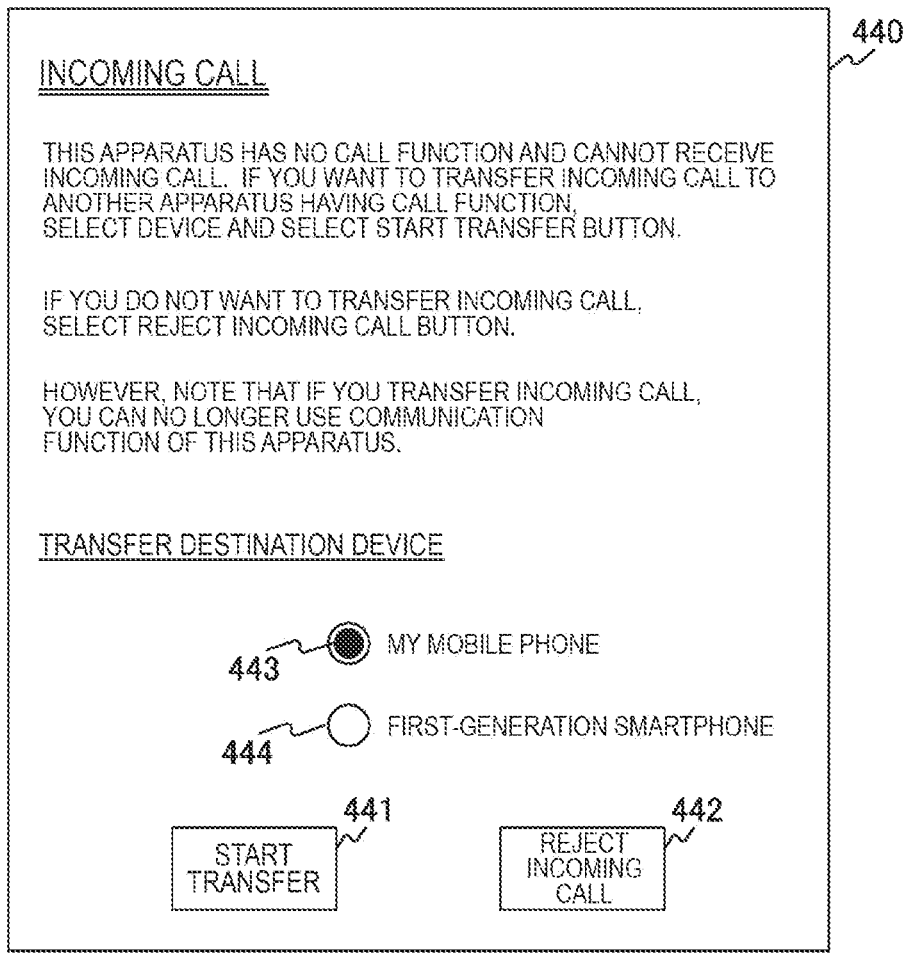
FIG. 9 is a diagram showing an exemplary display of display screens (the transfer setting screens 430, 440) displayed in the display unit 370 of the first wireless communication apparatus 130, according to the first exemplary embodiment.

FIGS. 8 and 9 are diagrams showing example displays of display screens (transfer setting screens 430, 440) displayed in a display unit 370 of the first wireless communication apparatus 130 according to the first embodiment of the present disclosure. The transfer setting screens 430, 440 are display screens displayed when the first wireless communication apparatus 130 receives a notification of an incoming call and displays screens to set the transfer of an MCIM.

In FIG. 8, it is assumed that the number of wireless communication apparatuses equipped with the call function in the group to which the first wireless communication apparatus 130 belongs is only one. In FIG. 9, it is assumed that the number of wireless communication apparatuses equipped with the call function in the group to which the first wireless communication apparatus 130 belongs is more than one (two).

The transfer setting screen 430 shown in FIG. 8 is a display screen for the first wireless communication apparatus 130 not equipped with the call function to perform a setting operation to transfer an incoming call to another wireless communication apparatus having the call function in the group to which the first wireless communication apparatus 130 belongs. On the transfer setting screen 430, a message to notify that an incoming call is received and the name (for example, a device name 224) of the other wireless communication apparatus equipped with the call function in the group to which the first wireless communication apparatus 130 belongs are displayed. In addition, a start transfer button 431 and a reject incoming call button 432 are displayed on the transfer setting screen 430.

The start transfer button 431 is a button pressed when the incoming call should be transferred to the other wireless communication apparatus equipped with the call function in the group to which the first wireless communication apparatus 130. When the start transfer button 431 is pressed, the MCIM set to the first wireless communication apparatus 130 is transferred to the wireless communication apparatus (the second wireless communication apparatus 300) whose device name is "My mobile phone". Then, after MCIM settings in the second wireless communication apparatus 300 is completed, the incoming call is transferred to the second wireless communication apparatus 300. The incoming call transfer process will be described in detail with reference to FIGS. 10 to 12.

The reject incoming call button 432 is a button pressed when an incoming call to the phone number identified by an MCIM 2 set to the first wireless communication apparatus 130 is rejected. When the reject incoming call button 432 is pressed, for example, a call terminating process is finished and also notification information for the notification of rejection of the incoming call is transmitted from the control unit 125 of the communication control apparatus (second communication operator) 120 to the communication apparatus 150 on the calling side.

The transfer setting screen 440 shown in FIG. 9 is a display screen to perform a setting operation to transfer an incoming call when a plurality of wireless communication apparatuses equipped with the call function is present in the group to which the first wireless communication apparatus 130 belongs. In FIG. 9, it is assumed that a fourth wireless communication apparatus (whose device name is "First-generation smartphone") equipped with the call function is entered in the group (group AB) to which the first wireless communication apparatus 130 belongs.

On the transfer setting screen 440, a message to notify that an incoming call is received, radio buttons 443, 444 to select the device of the transfer destination, a start transfer button 441, and a reject incoming call button 442 are displayed. The start transfer button 441 and the reject incoming call button 442 are substantially the same as the start transfer button 431 and the reject incoming call button 432 shown in FIG. 8 and thus, a portion of the description thereof is omitted.

The radio buttons 443, 444 are radio buttons to select the wireless communication apparatus in the transfer destination of the incoming call. If the radio button 443 is selected and the start transfer button 441 is pressed, the wireless communication apparatus (the second wireless communication apparatus 300) whose device name is "My mobile phone" is selected and the transfer of an MCIM and the transfer of the incoming call to the second wireless communication apparatus 300 are performed. If the radio button 444 is selected and the start transfer button 441 is pressed, the wireless communication apparatus (the fourth wireless communication apparatus) whose device name is "First-generation smartphone" is selected, and the transfer of an MCIM and the transfer of the incoming call to the fourth wireless communication apparatus are performed.

Conditions for the transfer setting screens 430, 440 to be displayed will be described here. First, the communication control apparatus (second communication operator) 120 having received an incoming call from the communication apparatus 150 on the calling side detects the presence/absence of the call function of the wireless communication apparatus to which an MCIM is set (for example, the communication control apparatus (second communication operator) 120 holds information (service content or the like) of apparatuses holding an MCIM and detects the presence/absence of the call function from the information). If the communication control apparatus (second communication operator) detects that the wireless communication apparatus has no call function, the communication control apparatus (second communication operator) notifies that there is an incoming call by using one of the functions included in the wireless communication apparatus holding the MCIM.

If, for example, the wireless communication apparatus is equipped with a function to display the transfer setting screens 430, 440 as a user interface, the communication control apparatus (second communication operator) 120 transmits information (incoming call information) to invoke the function to the wireless communication apparatus. Based on the incoming call information, the transfer setting screens 430, 440 are displayed. The incoming call information contains group information acquired by the communication control apparatus (second communication operator) 120 from the communication control apparatus (first communication operator) 200 and the wireless communication apparatus analyzes the presence/absence (see the call function information 227 in FIG. 4) of the call function of a plurality of wireless communication apparatuses belonging to the group. Then, the wireless communication apparatus causes the display unit to display the transfer setting screen 440 if there is a plurality of wireless communication apparatuses equipped with the call function in the group and causes the display unit to display the transfer setting screen 430 if there is one wireless communication apparatus equipped with the call function in the group.

The method of causing the display unit to display the transfer setting screens 430, 440 is not limited to the above method. If, for example, the wireless communication apparatus supports SMS (Short Message Service) or e-mail, a notification may be made using SMS or e-mail.

In FIGS. 8 and 9, a case when the display unit is caused to display the transfer setting screen 430 or 440 and the user is made to make selection is assumed, but the present embodiment is not limited to such an example. For example, when incoming call information is received, the wireless communication apparatus may determine the transfer start or the incoming call rejection based on content set by the user in advance so that the determination result is automatically transmitted to the communication control apparatus (second communication operator) 120.

[Example Transfer of Incoming Call]

Figure 10:
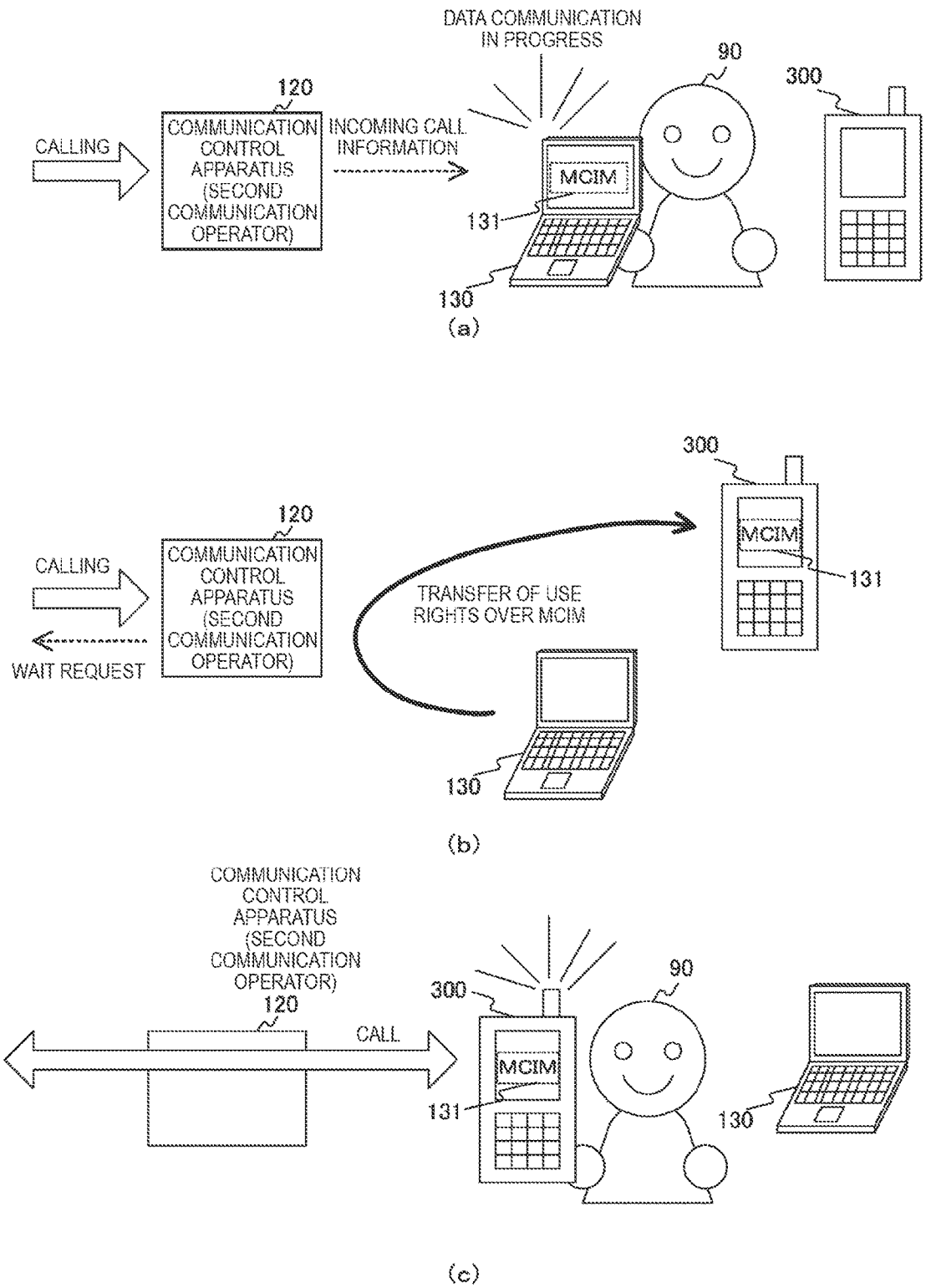
FIG. 10 is a simplified diagram showing the flow of transfer of an incoming call when a call is terminated in the first wireless communication apparatus 130 having no call function, according to the first exemplary embodiment.

FIG. 10 is a simplified diagram showing the flow of transfer of an incoming call when a call is terminated in the first wireless communication apparatus 130 having no call function according to the first embodiment of the present technology.

FIG. 10(*a*) shows a state in which there is an incoming call in the first wireless communication apparatus 130, FIG. 10(*b*) shows a state in which an MCIM is transferred to answer the incoming call, and FIG. 10(*c*) shows a state in which a call is made using the wireless communication apparatus in the transfer destination of the MCIM.

If, as shown in FIG. 10(*a*), an MCIM (MCIM 131) is set to the wireless communication apparatus (the first wireless communication apparatus 130) that is not equipped with the call function, an incoming call (calling) cannot be answered. Thus, the communication control apparatus (second communication operator) 120 transmits information (incoming call information) for the notification of the incoming call to the first wireless communication apparatus 130 using the communication function included in the first wireless communication apparatus 130. The first wireless communication apparatus 130 having received the incoming call information displays a transfer setting screen in the display unit 370 to cause the user to select whether to answer the incoming call (the transfer start or the incoming call rejection) by performing the transfer process of an MCIM.

If the user makes a selection that the incoming call should be answered, as shown in FIG. 10(*b*), the MCIM of the first wireless communication apparatus 130 is invalidated and the transfer process of the MCIM to transfer the MCIM to the second wireless communication apparatus 300 is performed. Accordingly, the first wireless communication apparatus 130 can no longer perform wireless communication that requires an MCIM. On the other hand, it becomes possible for the second wireless communication apparatus 300 to perform wireless communication that requires an MCIM. Accordingly, the user can answer an incoming call received in the timing in which an MCIM is set to the first wireless communication apparatus 130 by using the second wireless communication apparatus 300.

Then, when the incoming call is answered after the transfer process of the MCIM is completed, as shown in FIG. 10(*c*), a call state using the second wireless communication apparatus 300 is entered.

Figure 11:
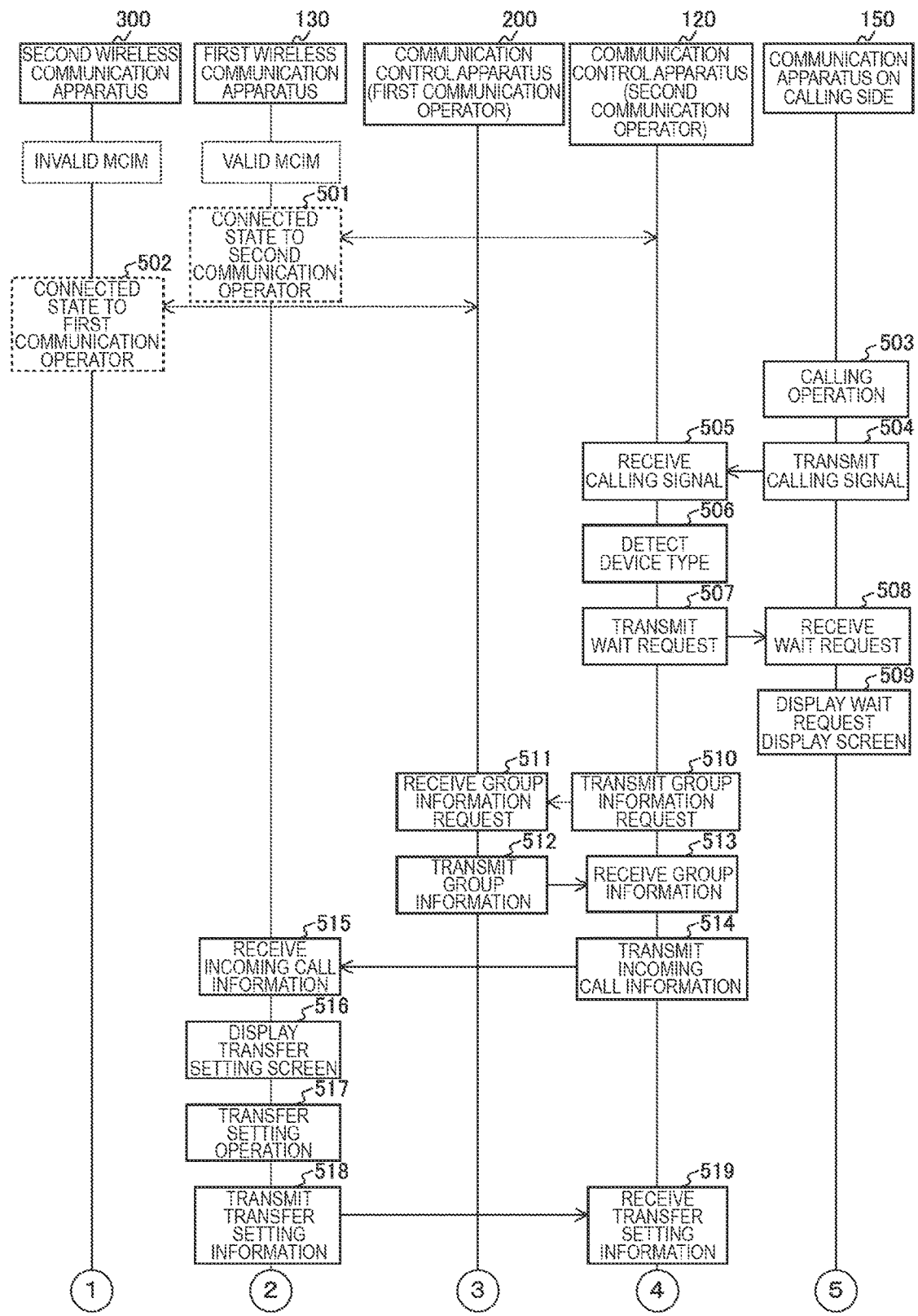
FIG. 11 is a sequence chart of an exemplary communication process performed by various apparatuses of the communication system 100, according to the first exemplary embodiment.
Figure 12:
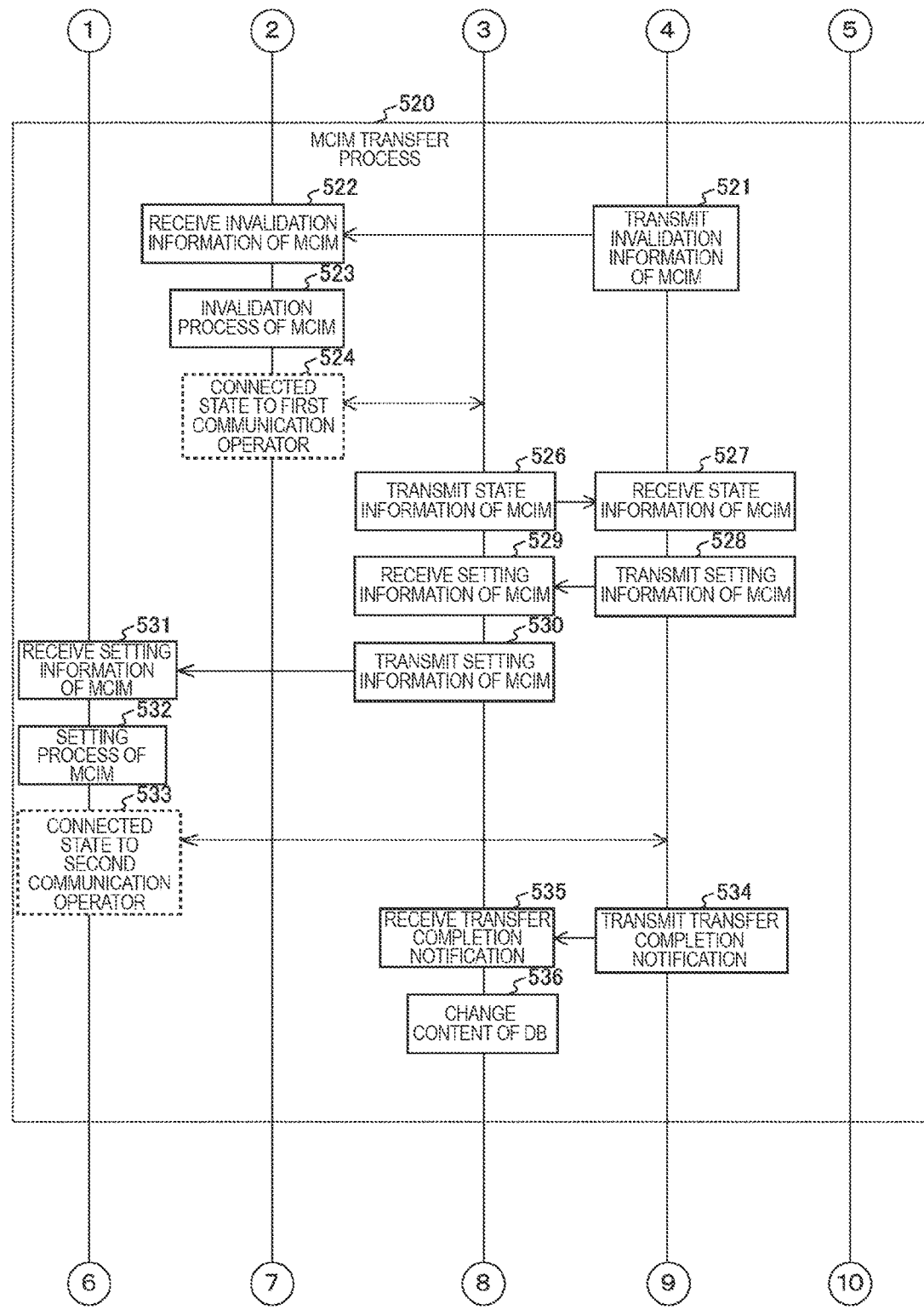
FIG. 12 is a sequence chart of an exemplary communication process performed by various apparatuses of the communication system 100, according to the first exemplary embodiment.
Figure 13:
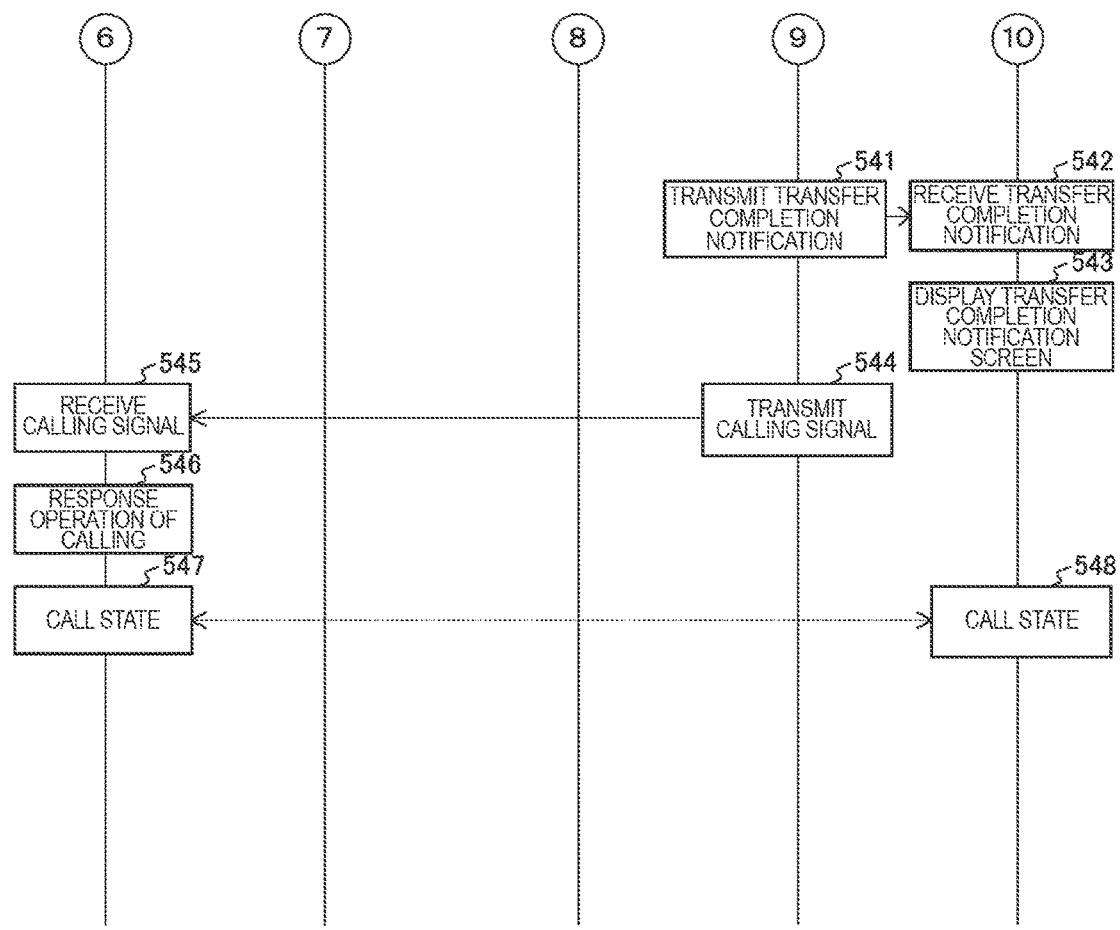
FIG. 13 is a sequence chart of an exemplary communication process performed by various apparatuses of the communication system 100, according to the first exemplary embodiment.

[Example Communication when Incoming Call Transfer Process is Performed] FIGS. 11 to 13 are sequence charts showing an exemplary communication process between each apparatus constituting the communication system 100 according to the first embodiment of the present technology.

FIGS. 11 to 13 assume a case when an incoming call transfer process is performed between the first wireless communication apparatus 130 and the second wireless communication apparatus 300. It is assumed here that the MCIM (valid MCIM) held by the first wireless communication apparatus 130 is transferred to the second wireless communication apparatus 300 and after the transfer, the incoming call is transferred. Incidentally, FIGS. 11 to 13 omit an illustration of the third wireless communication apparatus 140.

First, the communication control apparatus (second communication operator) 120 and the first wireless communication apparatus 130 are in a connected state (501) and the communication control apparatus (first communication operator) 200 and the second wireless communication apparatus 130 are in a connected state (502). Initially, the communication apparatus 150 on the calling side as the source of a call performs a call operation (calling operation) to the phone number identified by the MCIM set to the first wireless communication apparatus 130 (503). Then, when the call operation is performed (503), a calling signal is transmitted from the communication apparatus 150 on the calling side to the communication control apparatus (second communication operator) 120 (504, 505). The calling signal is a signal transmitted to call a remote party and in the case of a call, for example, a signal in accordance with the phone number of the remote party is transmitted. The communication control apparatus (second communication operator) 120 receives the calling signal as an execution request causing a wireless communication apparatus to execute a specific function using an MCIM.

When the calling signal is received by the communication control apparatus (second communication operator) 120 (505), the control unit 125 of the communication control apparatus (second communication operator) 120 detects the presence/absence of the call function of the wireless communication apparatus to which the MCIM related to the called phone number is set (506). That is, the device type is detected (506). The detection is determined based on content of services currently provided by the communication control apparatus (second communication operator) 120 to the wireless communication apparatus to which the MCIM is set. If, for example, an MCIM is set to a mobile phone equipped with the call function and the data communication function, the call function and the data communication function are services currently being provided. On the other hand, if an MCIM is set to a notebook personal computer equipped with only the data communication function, the data communication function is a service currently being provided.

Then, if detected that the MCIM related to the called phone number is set to a wireless communication apparatus (the first wireless communication apparatus 130) having no call function (506), the control unit 125 transmits a wait request to the communication apparatus 150 on the calling side (507, 508). When the communication apparatus 150 on the calling side receives the wait request (508), a wait request display screen (see FIG. 7(a)) is displayed in the display unit of the communication apparatus 150 on the calling side (509).

If detected that the MCIM related to the called phone number is set to a wireless communication apparatus having no call function (506), the control unit 125 transmits a group information request to the communication control apparatus (first communication operator) 200 (510, 511). Then, the communication control apparatus (first communication operator) 200 having received the group information request transmits the group information of the group to which the MCIM related to the called phone number belongs to the communication control apparatus (second communication operator) 120 (512, 513).

Then, when the group information is received (513), the communication control apparatus (second communication operator) 120 transmits incoming call information containing the group information to the first wireless communication apparatus 130 (514, 515). Accordingly, information about the incoming call is conveyed to the first wireless communication apparatus 130 and also information (call function information (the call function information 227 in FIG. 4) of the group information) about wireless communication apparatuses equipped with the call function is conveyed. The incoming call information contains, in addition to the group information, information about the incoming call such as the phone number of the calling side. The first wireless communication apparatus 130 receives the incoming call information as an execution request causing a wireless communication apparatus to execute a specific function using an MCIM.

Subsequently, when the incoming call information containing the group information is received (515), the first wireless communication apparatus 130 causes the display unit 370 to display a transfer setting screen (see, for example, FIGS. 8 and 9) (516). Here, when the transfer setting screen is displayed, whether there is a plurality of wireless communication apparatuses equipped with the call function among wireless communication apparatuses belonging to the same group is determined based on the group information. Then, if there is a plurality of wireless communication apparatuses equipped with the call function, the transfer setting screen 440 (FIG. 9) from which the wireless communication apparatus of the transfer destination can be selected is displayed. On the other hand, if there is one wireless communication apparatus equipped with the call function, the transfer setting screen 430 (FIG. 8) on which only the selection of whether to start the transfer can be made is displayed. Then, the transfer is set by a user's operation (517). In this example, the second wireless communication apparatus 300 (device name "My mobile phone") is decided as the device of the transfer destination.

Thus, when a transfer setting operation is performed in the first wireless communication apparatus 130 (517), transfer setting information is transmitted from the first wireless communication apparatus 130 to the communication control apparatus (second communication operator) 120 (518, 519). The transfer setting information contains information (for example, terminal identification information 225 in FIG. 4) indicating the wireless communication apparatus of the transfer destination and information requesting the start of transfer. The first wireless communication apparatus 130 transmits the transfer setting information as a setting request to cause the setting of an MCIM.

Then, when the first wireless communication apparatus 130 receives the transfer setting information (519), a transfer process of the MCIM (MCIM transfer process 520) is performed.

In the MCIM transfer process 520, first when the communication control apparatus (second communication operator) 120 receives the transfer setting screen (519), the control unit 125 of the communication control apparatus (second communication operator) 120 transmits invalidation information of MCIM to the first wireless communication apparatus 130 (521, 522). The invalidation information of MCIM is information to invalidate an MCIM of a wireless communication apparatus holding the MCIM as a valid MCIM. In this case, the first wireless communication apparatus 130 in a connected state with the communication control apparatus (second communication operator) 120 (501). Thus, the invalidation information of MCIM is directly transmitted from the communication control apparatus (second communication operator) 120 to the first wireless communication apparatus 130 (521, 522).

When the first wireless communication apparatus 130 receives the invalidation information of MCIM (522), an invalidation process of MCIM stored in the MCIM information storage unit 350 of the first wireless communication apparatus 130 is performed (523). Accordingly, the MCIM held by the first wireless communication apparatus 300 is invalidated and so the first wireless communication apparatus 130 can no longer establish connection to the communication control apparatus (second communication operator)

120 based on the MCIM. Thus, the first wireless communication apparatus 130 is in a connected state connected to the communication control apparatus (first communication operator) 200 by a limited connection based on PCID (524).

When the invalidation process of MCIM in the transfer source (the first wireless communication apparatus 130) is performed (523) and the connection between the transfer source and the communication control apparatus (second communication operator) 120 is cut, the disconnection is detected by the control unit 210 of the communication control apparatus (first communication operator) 200. For example, the control unit 210 can detect the disconnection based on, after the invalidation process of MCIM is performed, information about the disconnection being transmitted from the transfer source (the first wireless communication apparatus 130) to the communication control apparatus (first communication operator) 200. Alternatively, the control unit 210 can detect the disconnection based on a state (connected state) in which the transfer source (the first wireless communication apparatus 130) is connected to the communication control apparatus (first communication operator) 200 by a limited connection based on PCID being detected by the control unit 210.

When the control unit 210 of the communication control apparatus (first communication operator) 200 detects the disconnection between the transfer source and the communication control apparatus (second communication operator) 120 as described above, the control unit 210 transmits state information of MCIM to the communication control apparatus (second communication operator) 120 (526, 527). The state information of MCIM is information indicating that a valid MCIM is set to none of wireless communication apparatuses.

When the communication control apparatus (second communication operator) 120 receives the state information of MCIM (527), the control unit 125 of the communication control apparatus (second communication operator) 120 transmits setting information of MCIM to the second wireless communication apparatus 300 (528 to 531). The setting information of MCIM is information to set a valid MCIM to a wireless communication apparatus. In this case, the second wireless communication apparatus 300 is in a connected state with the communication control apparatus (first communication operator) 200 (502). Thus, the setting information of MCIM is transmitted from the communication control apparatus (second communication operator) 120 to the second wireless communication apparatus 300 via the communication control apparatus (first communication operator) 200 (528 to 531).

When the second wireless communication apparatus 300 receives the setting information of MCIM (531), a setting process (for example, a validation process) of MCIM is performed on the MCIM information storage unit 350 of the second wireless communication apparatus 300 (531). A valid MCIM is thereby set to the second wireless communication apparatus 300 and thus, the second wireless communication apparatus 300 can establish connection to the communication control apparatus (second communication operator) 120 based on the MCIM (533). That is, the second wireless communication apparatus 300 is in a connected state to the communication control apparatus (second communication operator) 120 through connection based on the MCIM (533).

When the second wireless communication apparatus 300 enters a connected state to the communication control apparatus (second communication operator) 120 as described above (533), the communication control apparatus (second communication operator) 120 transmits a transfer completion notification to the communication control apparatus (first communication operator) 200 (534, 535). The transfer completion notification is a notification indicating that the transfer process of MCIM is completed. Then, when the communication control apparatus (first communication operator) 200 receives the transfer completion notification (535), the control unit 210 of the communication control apparatus (first communication operator) 200 updates content of the group management database 220 (shown in FIG. 3) (536). In valid/invalid information 226 shown in FIG. 4, for example, the first wireless communication apparatus 130 (the terminal identification information 225 "PCID#1") is changed from "valid" to "invalid". On the other hand, the second wireless communication apparatus 300 (the terminal identification information 225 "PCID#2") is changed from "invalid" to "valid".

Subsequently, when the transfer process of MCIM (the MCIM transfer process 520) is completed, the communication control apparatus (second communication operator) 120 transmits a transfer completion notification to the communication apparatus 150 on the calling side (541, 542). The transfer completion notification is information to notify the communication apparatus 150 on the calling side that the transfer process of MCIM is completed. Then, when the communication apparatus 150 on the calling side receives the transfer completion notification (542), the communication apparatus 150 on the calling side causes the display unit to display a transfer completion notification screen (for example, FIG. 7(*b*)) (543). Accordingly, the calling person can know that the remote party will soon answer the call.

When the transfer process of MCIM (the MCIM transfer process 520) is completed, the communication control apparatus (second communication operator) 120 transmits a calling signal to the second wireless communication apparatus 300 (544, 545). The calling signal is a signal transmitted to call a remote party and in the case of a call, for example, a signal in accordance with the phone number of the remote party is transmitted. Then, when the second wireless communication apparatus 300 receives the calling signal (545), an answer operation is performed by the user in the second wireless communication apparatus 300 (546). Then, the second wireless communication apparatus 300 and the communication apparatus 150 on the calling side enter a call state (547, 548).

[Example Operation of Communication System] Next, the operation of the communication system 100 according to the first embodiment of the present technology will be described with reference to drawings.

[Example Operation of Wireless Communication Apparatus of MCIM Transfer Source]

Figure 14:
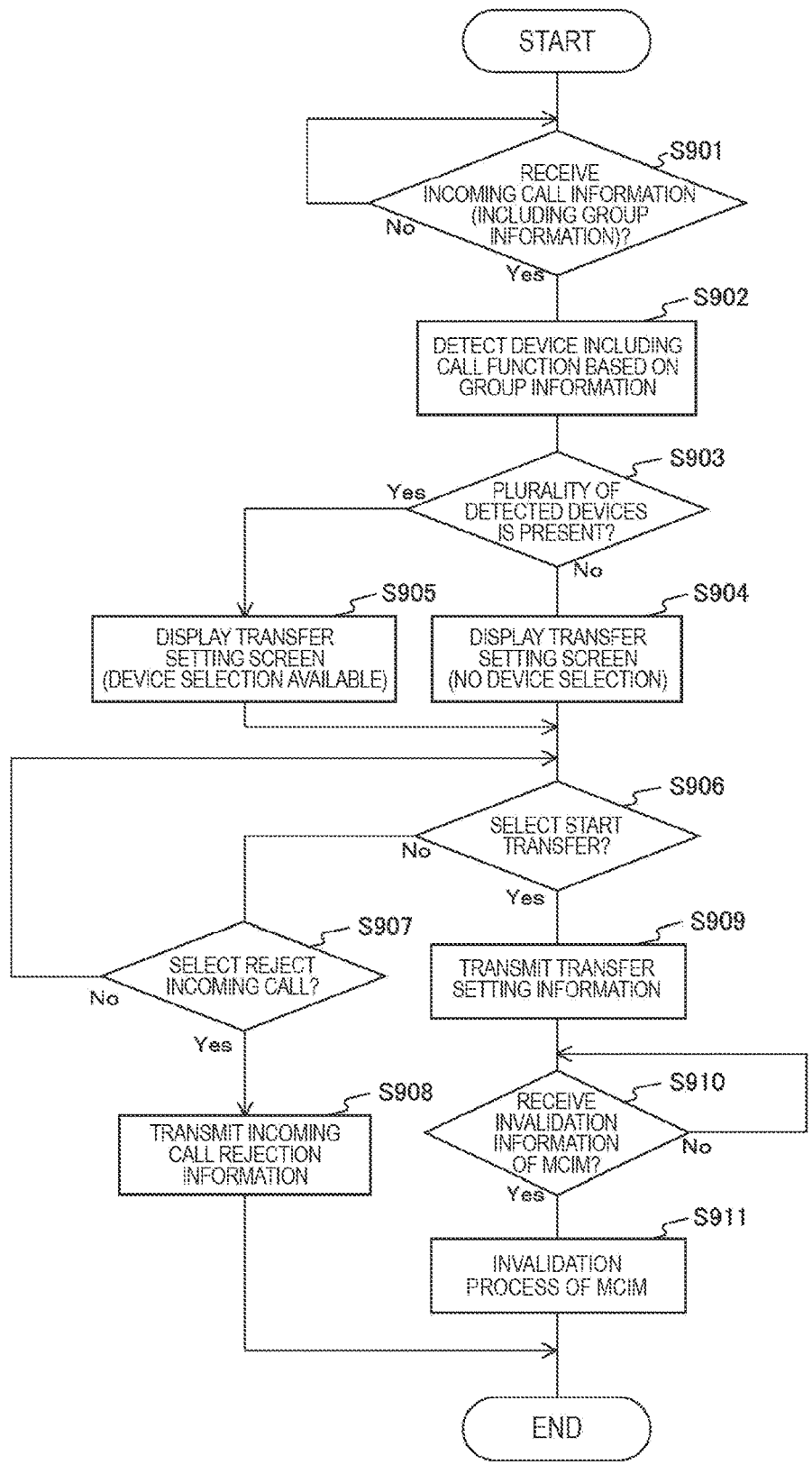
FIG. 14 is a flowchart of an exemplary communication process performed by a wireless communication apparatus (the first wireless communication apparatus 130) of a transfer source of MCIM, according to the first exemplary embodiment.

FIG. 14 is a flowchart of an exemplary communication process performed by a wireless communication apparatus (the first wireless communication apparatus 130) of a transfer source of MCIM according to the first embodiment of the present technology.

First, the control unit 330 of the first wireless communication apparatus 130 determines whether incoming call information (including group information) transmitted by the communication control apparatus (second communication operator) 120 is received by the first wireless communication apparatus 130 (step S901) and, if not received, continues to monitor.

Then, when incoming call information and group information are received (step S901), the control unit 330 detects any wireless communication apparatus equipped with the call function in the same group based on the group information (step S902). Next, the control unit 330 determines whether a plurality of wireless communication apparatuses equipped with the call function in the group is present (step S903). Then, if the control unit determines that only one wireless communication apparatus equipped with the call function is present in the group (step S903), a transfer setting screen (see, for example, FIG. 8) having no selection item of the wireless communication apparatus is displayed in the display unit 370 (step S904) before proceeding to step S906. Incidentally, step S901 is an example of a reception procedure described in claims.

On the other hand, if the control unit determines that a plurality of wireless communication apparatuses equipped with the call function is present in the group (step S903), the control unit 330 causes the display unit 370 to display a transfer setting screen (see, for example, FIG. 9) having selection items of wireless communication apparatuses (devices) (step S905).

Then, the control unit 330 determines whether the transfer start of an incoming call is selected (the start transfer button in FIG. 8 or FIG. 9 is pressed) by a user's selection operation on the transfer setting screen displayed in the display unit 370 (step S906). If the control unit determines that the transfer start is not selected (step S906), the control unit 330 determines whether the incoming call rejection is selected (step S907). If the control unit determines that the incoming call rejection is selected (step S907), the control unit transmits information (incoming call rejection information) to notify the communication control apparatus (second communication operator) 120 of the incoming call rejection to the communication control apparatus (second communication operator) 120 (step S908). Then, when step S908 ends, the operation of the communication process by the wireless communication apparatus of the transfer source ends.

On the other hand, if the control unit determines that the incoming call rejection is not selected in the determination of whether the incoming call rejection is selected (step S907), the process returns to step S906.

If the control unit determines that the transfer start is selected in the determination of whether the transfer start of an incoming call is selected (step S906), transfer setting information about transfer settings is transmitted to the communication control apparatus (second communication operator) 120 (step S909). With the transmission of the transfer setting information, an execution instruction to transfer an incoming call by transferring an MCIM and information to specify the wireless communication apparatus in the transfer destination of MCIM are transmitted. Incidentally, step S909 is an example of an execution procedure described in claims.

Then, the control unit 330 determines whether invalidation information of MCIM transmitted from the communication control apparatus (second communication operator) 120 is received (step S910) and, if not received, continues to monitor for reception.

On the other hand, if the control unit determines that invalidation information of MCIM is received (step S910), the control unit 330 performs an invalidation process of the MCIM held by the MCIM information storage unit 350 (step S911) before finishing the operation of the communication process by the wireless communication apparatus of the transfer source.

[Example Operation of Wireless Communication Apparatus of MCIM Transfer Destination]

Figure 15:
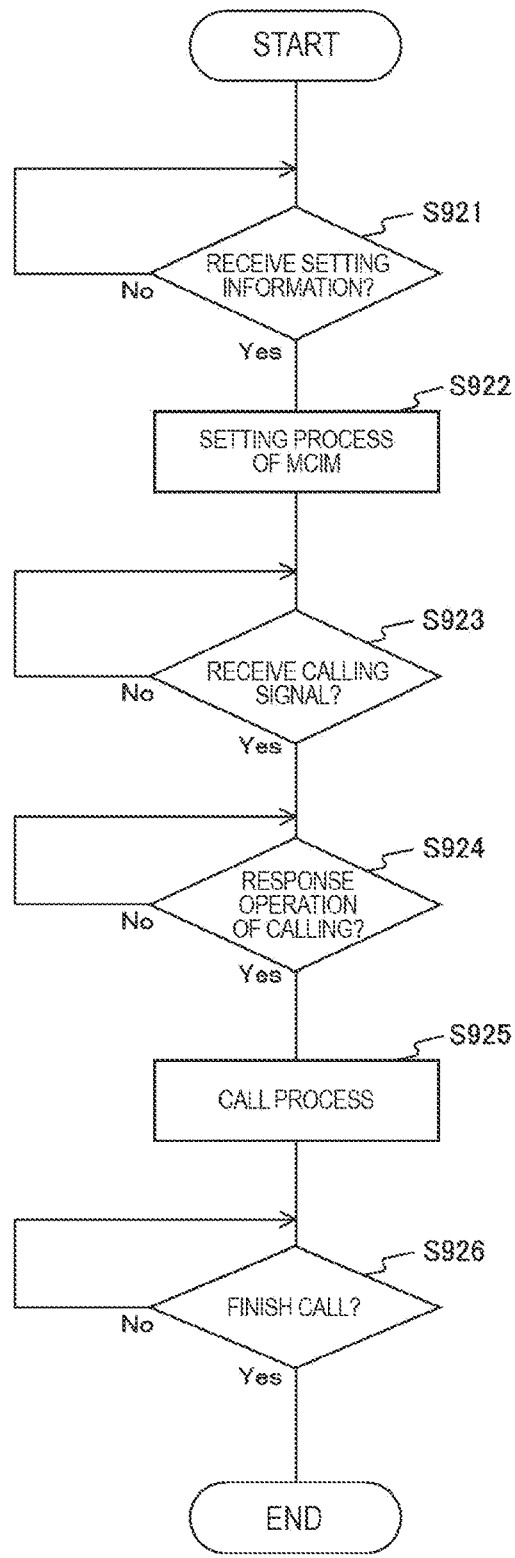
FIG. 15 is a flowchart of an exemplary communication process performed by a wireless communication apparatus (the second wireless communication apparatus 300) of a transfer destination of MCIM, according to the first exemplary embodiment.

FIG. 15 is a flowchart of an exemplary communication process performed by a wireless communication apparatus (the second wireless communication apparatus 300) of a transfer destination of MCIM according to the first embodiment of the present technology.

First, the control unit 330 determines whether setting information transmitted from the communication control apparatus (second communication operator) 120 is received (step S921) and, if not received, continues to monitor for reception.

On the other hand, if the control unit determines that setting information is received (step S921), the control unit 330 performs a setting process of MCIM to the MCIM information storage unit 350 (step S922). Then, the control unit 330 determines whether a calling signal of a call is received (step S923) and, if not received, continues to monitor for reception.

Then, when the control unit 330 determines that a calling signal is received (step S923), the control unit 330 determines whether the user answers the calling by the calling signal (step S924) and, if not answered, continues to monitor for an answer.

Then, when the control unit 330 determines that the user answers the calling by the calling signal (step S924), a call process with the communication apparatus on the calling side is performed (step S925). Then, the control unit 330 determines whether the call is finished (step S926) and, if not finished, continues to monitoring for an end of the call.

On the other hand, if the control unit 330 determines that the call is finished (step S926), the control unit terminates the operation of the communication process by the wireless communication apparatus of the transfer destination.

[Example Operation of Second Communication Operator]

Figure 16:
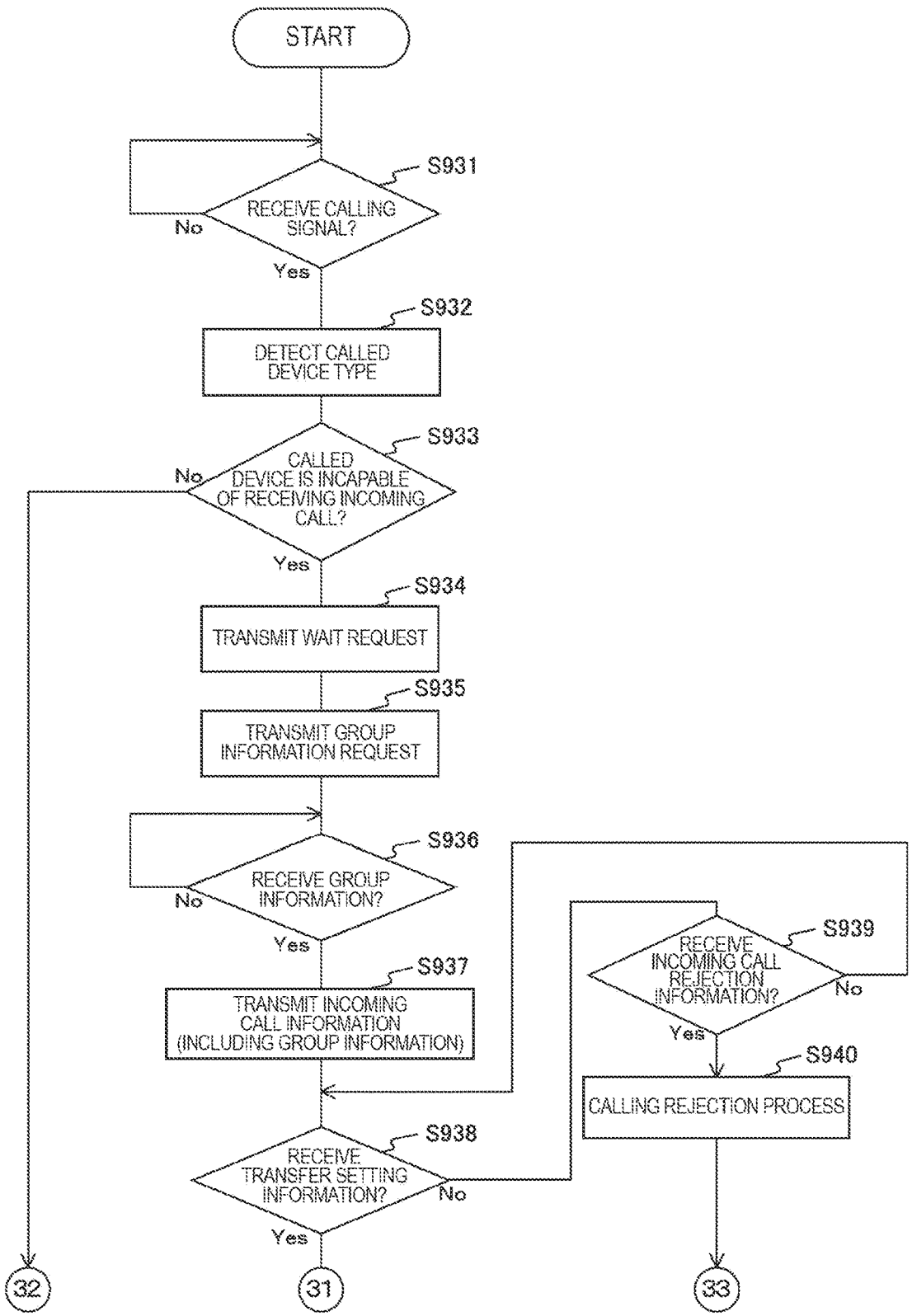
FIG. 16 is a flowchart of an exemplary communication process performed by a communication control apparatus (second communication operator) 120, according to the first exemplary embodiment.
Figure 17:
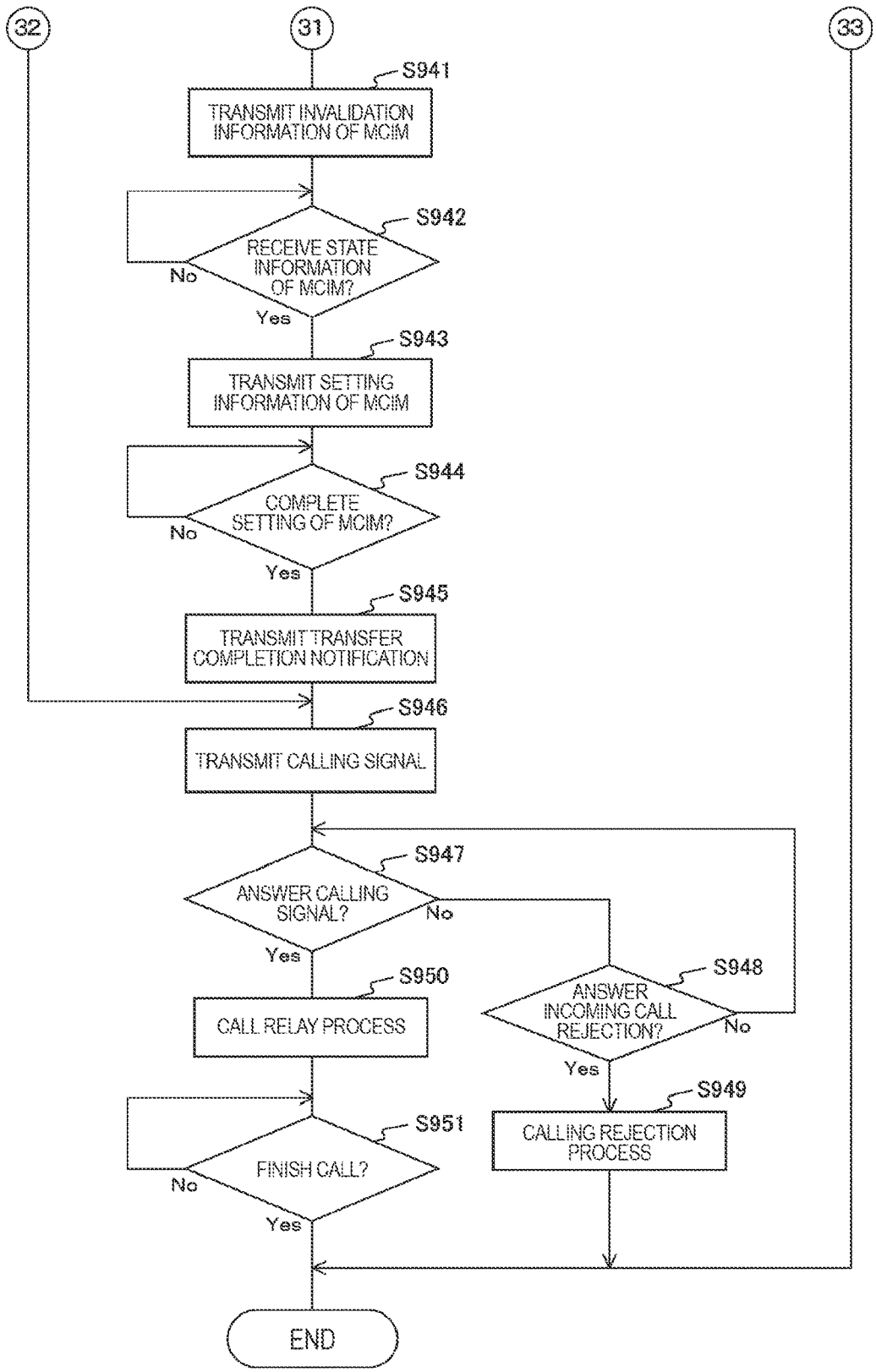
FIG. 17 is a flowchart of an exemplary communication process performed by the communication control apparatus (second communication operator) 120, according to the first exemplary embodiment.

FIGS. 16 and 17 are a flowchart of an exemplary communication process performed by the communication control apparatus (second communication operator) 120 according to the first embodiment of the present technology.

First, the control unit 125 of the communication control apparatus (second communication operator) 120 determines whether a calling signal submitted by the communication apparatus (the communication apparatus 150 on the calling side) having made a call is received (step S931) and, if not received, continues to monitor for reception.

On the other hand, if the control unit 125 determines that a calling signal is received (step S931), the control unit 125 detects the device type (functions included in the device) of the device (wireless communication apparatus) to which the MCIM related to the called phone number is set (step S932). Then, the control unit 125 determines whether the called device is incapable of terminating a call (no call function) (step S933). If the control unit 125 determines that the called device is capable of terminating a call (the call function is available) (step S933), the control unit proceeds to step S946. The case when the control unit 125 determines that the called device is capable of terminating a call is a case when, for example, an MCIM is set to the second wireless communication apparatus 300. Incidentally, step S931 is an example of the reception procedure described in claims.

On the other hand, if the control unit 125 determines that the called device is incapable of terminating a call (step S933), the control unit 125 transmits a wait request to the communication apparatus 150 on the calling side (step S934). The control unit 125 also transmits a request of group information (group information request) about the group to which the device holding the MCIM related to the called phone number belongs to the communication control apparatus (first communication operator) 200 (step S935).

Then, the control unit 125 determines whether group information transmitted by the communication control apparatus (first communication operator) 200 is received (step S936) and, if not received, continues to monitor for reception.

On the other hand, if the control unit 125 determines that group information is received (step S936), the control unit transmits incoming call information containing the group information to the device (the first wireless communication apparatus 130) holding the MCIM related to the called phone number (step S937). Then, the control unit 125 determines whether transfer setting information transmitted by the first wireless communication apparatus 130 is received (step S938). Then, the control unit 125 determines that transfer setting information is not received (step S939), the control unit 125 determines whether incoming call rejection information is received (step S939) and, if not received, returns to step S938.

If the control unit determines that incoming call rejection information is received (step S939), the operation of the communication process by the communication control apparatus (second communication operator) 120 is terminated after a process (calling rejection process) to reject calling by the communication apparatus 150 on the calling side (step S940).

On the other hand, if the control unit determines that transfer setting information is received in the determination of whether transfer setting information transmitted by the first wireless communication apparatus 130 is received (step S938), the control unit 125 transmits invalidation information of MCIM to the first wireless communication apparatus 130 (step S941). Then, the control unit 125 determines whether setting information of MCIM transmitted from the communication control apparatus (first communication operator) 200 is received (step S942) and, if not received, continues to monitor for reception.

On the other hand, if the control unit 125 determines that setting information of MCIM is received (step S942), the control unit 125 transmits the setting information of MCIM to the device (the second wireless communication apparatus 300) of the transfer destination specified by the transfer setting information (step S943). The setting information is transmitted via the communication control apparatus (first communication operator) 200.

Then, the control unit 125 determines whether MCIM settings in the second wireless communication apparatus 300 are completed (step S944) and, if not completed, continues to monitor for completion. The determination whether MCIM settings are completed is made by detecting that, for example, the second wireless communication apparatus 300 is in a state allowing to communicate with the communication control apparatus (second communication operator) 120.

If the control unit 125 determines that MCIM settings in the second wireless communication apparatus 300 are completed (step S944), the control unit 125 transmits a transfer completion notification to the communication apparatus 150 on the calling side (step S945). Then, the control unit 125 transmits a calling signal to the called phone number (step S946). Subsequently, the control unit 125 determines whether the calling signal is answered (taken) (step S947). Then, if the control unit 125 determines that the calling signal not answered (step S947), the control unit 125 determines whether any response of incoming call rejection is received (step S948) and, if there is no response of incoming call rejection, returns to step S947. Incidentally, steps S941, S943, S946 are examples of the execution procedure described in claims.

On the other hand, if the control unit 125 determines that any response of incoming call rejection is received (step S948), the operation of the communication process by the communication control apparatus (second communication operator) 120 is terminated after a calling rejection process (step S949).

If the control unit 125 determines that the calling signal is answered in the determination of whether the calling signal is answered (step S947), a process (call relay process) to relay the call between the communication apparatus 150 on the calling side and the second wireless communication apparatus 300 is performed (step S950).

Then, the control unit 125 determines whether the call between the communication apparatus 150 on the calling side and the second wireless communication apparatus 300 is finished (step S951) and, if the call is not finished, continues to monitor for the end. If the control unit 125 determines that the call is finished (step S951), the operation of the communication process by the communication control apparatus (second communication operator) 120 is terminated by terminating the call relay process.

According to the first embodiment of the present technology, as described above, when there is an incoming call in a wireless communication apparatus that is not equipped with the call function, the incoming call can be answered after transferring the MCIM set to the wireless communication apparatus to a wireless communication apparatus equipped with the call function. That is, calling to a function that is not included in a wireless communication apparatus holding an MCIM can be answered by transferring the MCIM to the wireless communication apparatus including the function.

2. Second Embodiment

In the first embodiment of the present technology, an example in which, after incoming call information containing group information being transmitted to the first wireless communication apparatus 130, the first wireless communication apparatus 130 sets (decides) the wireless communication apparatus of the transfer destination of an incoming call based on the group information is described. However, the communication control apparatus (second communication operator) 120 or the communication control apparatus (first communication operator) 200 may also decide the wireless communication apparatus of the transfer destination of an incoming call.

Thus, in the second embodiment of the present technology, an example in which the communication control apparatus (second communication operator) 120 decides the wireless communication apparatus of the transfer destination of an incoming call will be described with reference to FIGS. 18 to 21.

An exemplary system configuration in the second embodiment of the present technology and an exemplary internal configuration of a wireless communication apparatus are similar to those shown in FIGS. 2, 3, 5, and 6 and thus, a description thereof here is omitted.

[Example Communication when Incoming Call Transfer Process is Performed]

Figure 18:
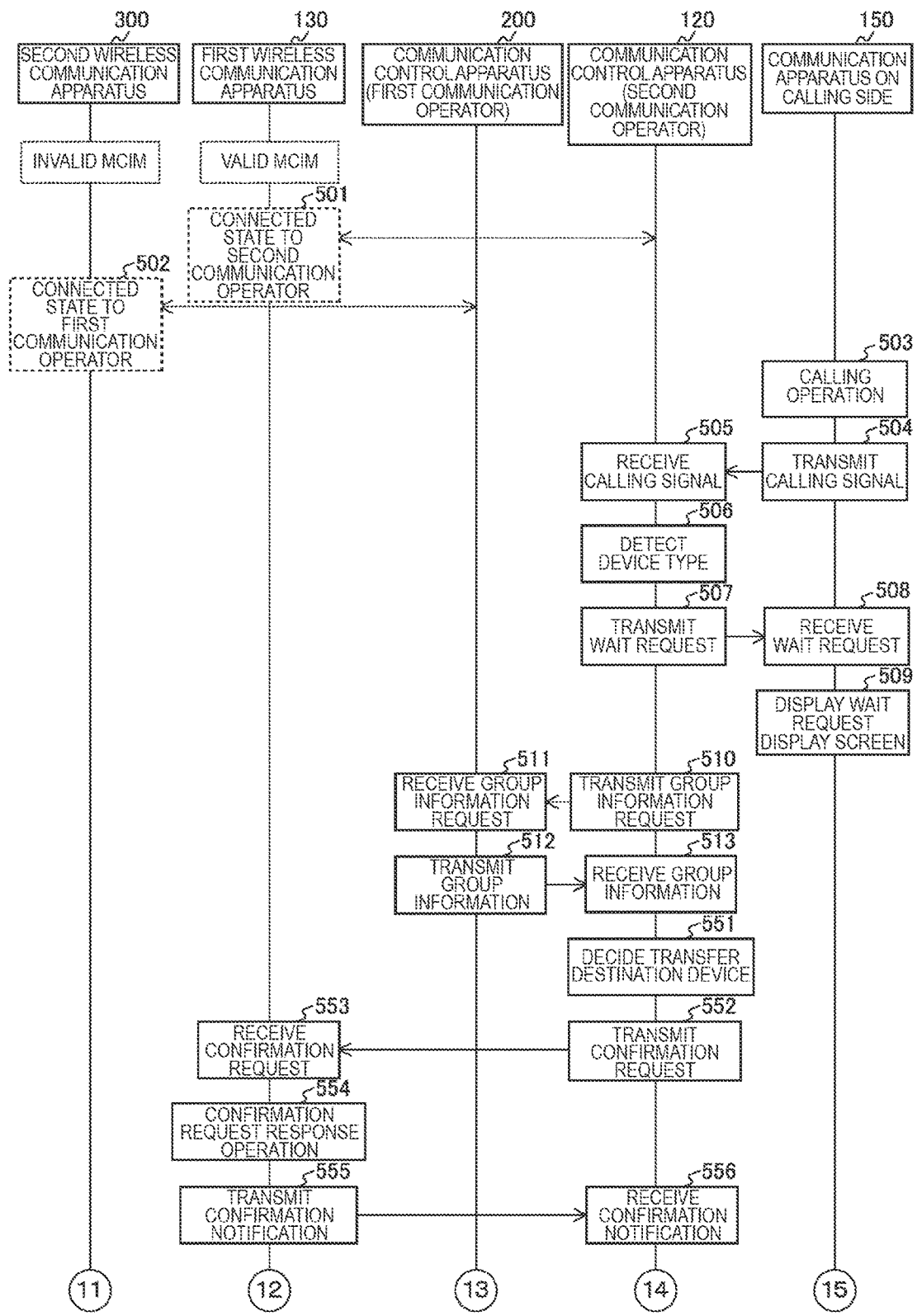
FIG. 18 is a sequence chart of an exemplary communication process performed by various apparatuses of a communication system, according to a second exemplary embodiment.
Figure 19:
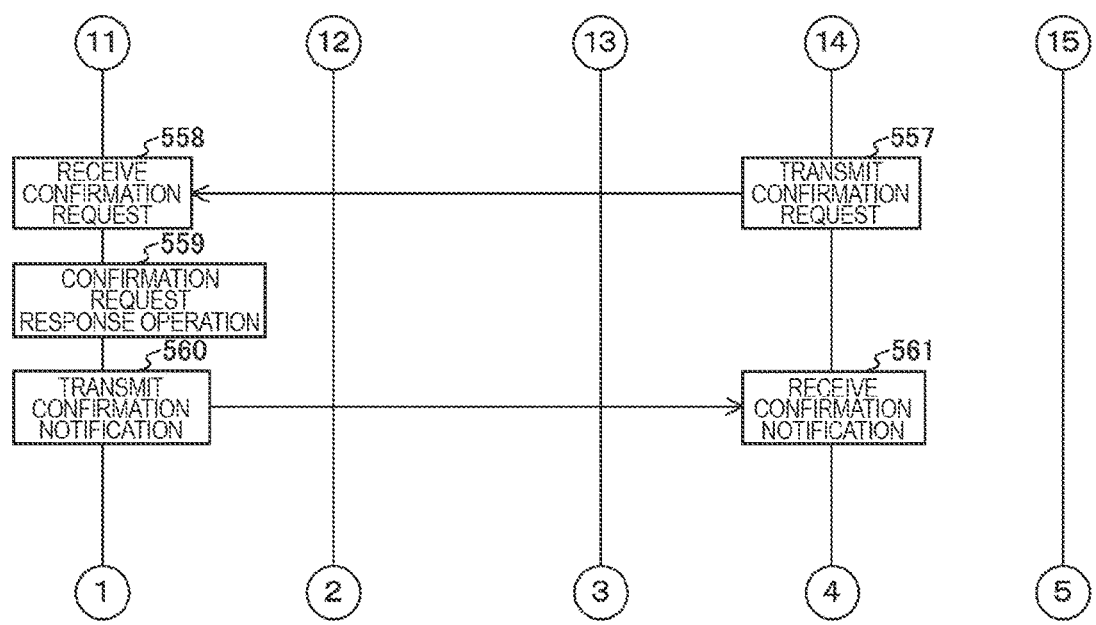
FIG. 19 is a sequence chart of an exemplary communication process performed by various apparatuses of the communication system, according to the second exemplary embodiment.

FIGS. 18 and 19 are a sequence chart of an exemplary communication process performed by various apparatuses of a communication system according to the second embodiment of the present technology.

The sequence chart shown in FIGS. 18 and 19 is a modification of the sequence chart shown in FIG. 11 and is different in that the communication control apparatus (second communication operator) 120 decides the wireless communication apparatus of the transfer destination of an incoming call. Thus, in FIGS. 18 and 19, the same reference signs as those in FIG. 11 are attached to portions common to those in FIG. 11 to omit the description thereof here. The latter portion (corresponding to the portions in FIGS. 12 and 13) of the sequence chart shown in FIG. 19 is similar to FIGS. 12 and 13 and thus, an illustration and description thereof here is omitted.

In FIGS. 18 and 19, an example in which confirmation (permission) to transfer an MCIM to the wireless communication apparatus decided by the communication control apparatus (second communication operator) 120 is requested from the user will be described.

In the sequence chart shown in FIG. 18, after the communication control apparatus (second communication operator) 120 receives group information (513), the communication control apparatus (second communication operator) 120 decides the wireless communication apparatus of the transfer destination of an incoming call (551). In this decision, the wireless communication apparatus preset by the user is decided as the transfer destination. In this example, the second wireless communication apparatus 300 is decided as the device (wireless communication apparatus) of the transfer destination.

Then, the communication control apparatus (second communication operator) 120 transmits a confirmation request to request the confirmation of the transfer of an MCIM and the transfer of an incoming call to the wireless communication apparatus (the first wireless communication apparatus 130) to which the MCIM is currently set (552, 553). Subsequently, when the first wireless communication apparatus 130 receives the confirmation request, a response operation to the confirmation request is performed by a user's operation (554). In the response operation, for example, the display unit 370 is caused to display a screen like the transfer setting screen 430 in FIG. 8 to allow the user to select the transfer start (confirmation) or the incoming call rejection.

Then, when a response operation of the confirmation (transfer start) is performed by a user's operation (554), a confirmation notification is transmitted from the first wireless communication apparatus 130 to the communication control apparatus (second communication operator) 120 (555, 556). The confirmation notification is information indicating that the user has confirmed the wireless communication apparatus of the transfer destination of an incoming call decided by the communication control apparatus (second communication operator) 120 and the transfer of MCIM to the wireless communication apparatus is permitted.

Then, the communication control apparatus (second communication operator) 120 having received the confirmation notification from the first wireless communication apparatus 130 (556) transmits a confirmation request to the wireless communication apparatus (the second wireless communication apparatus 300) as the transfer destination of an incoming call (557, 558). Then, when the second wireless communication apparatus 300 receives the confirmation request, a response operation to the confirmation request is performed by a user's operation (559). In the response operation, for example, the display unit 370 is caused to display a notification of the transfer start together with a button for confirmation to allow the user to confirm the transfer start. Then, when a response operation is performed by a user's operation (559), a confirmation notification is transmitted from the first wireless communication apparatus 130 to the communication control apparatus (second communication operator) 120 (560, 561). The transfer of MCIM to a wireless communication apparatus the user does not keep handy currently can be prevented by performing a confirmation operation by a user's operation in both of the wireless communication apparatus of the transfer source and the wireless communication apparatus of the transfer destination.

In FIGS. 18 and 19, an example in which user's confirmation is requested in both of the wireless communication apparatus of the transfer source and the wireless communication apparatus of the transfer destination is described, but the present embodiment is not limited to such an example. A case when the transfer process of MCIM is started without requesting confirmation or a case when confirmation is requested only in the wireless communication apparatus of the transfer source can be considered.

[Example Operation of Communication System]

Next, the operation of the communication system according to the second embodiment of the present technology will be described with reference to drawings.

[Example Operation of Wireless Communication Apparatus of MCIM Transfer Source]

Figure 20:
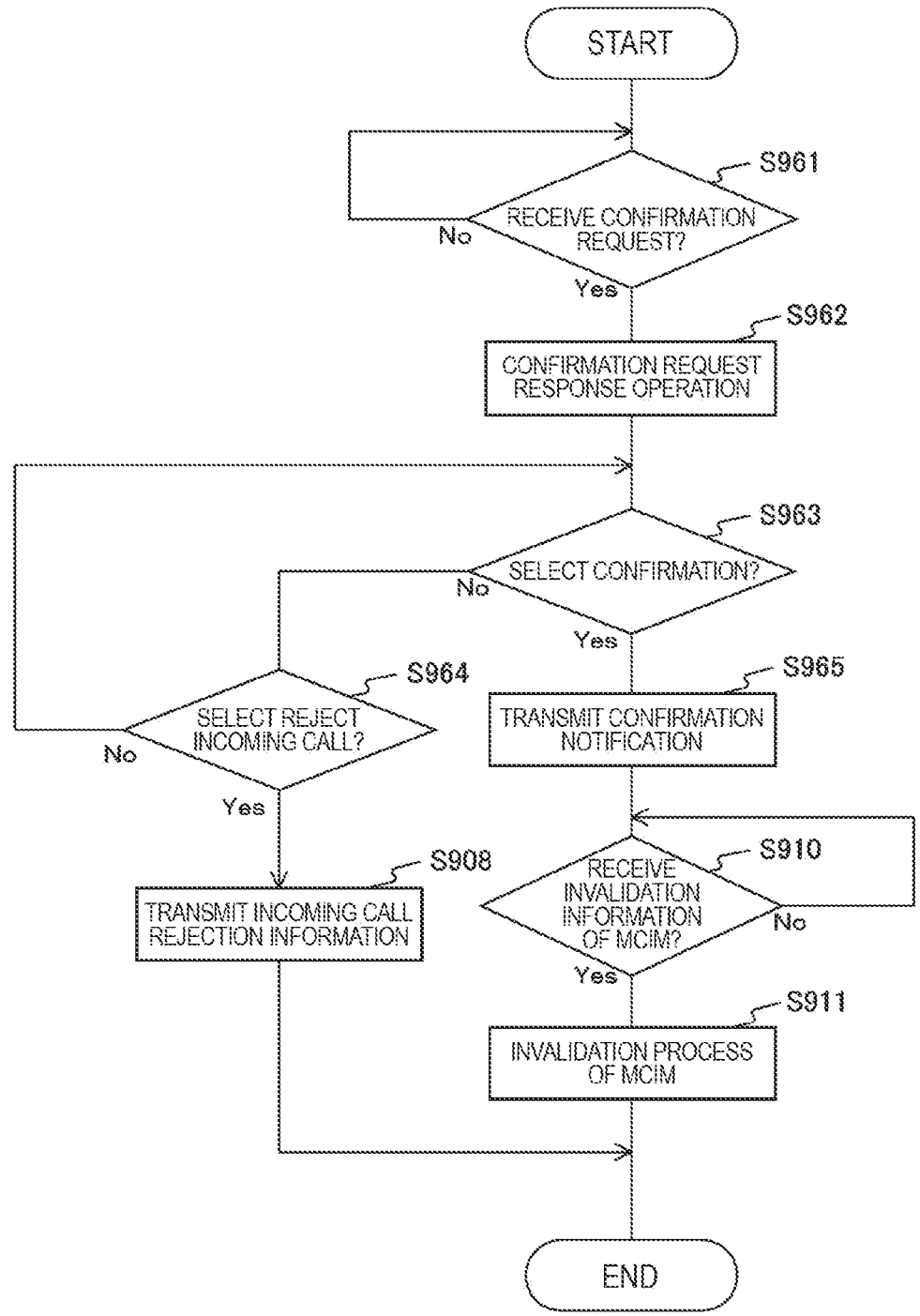
FIG. 20 is a flowchart of an exemplary communication process performed by the wireless communication apparatus (the first wireless communication apparatus 130) of the transfer source of MCIM, according to the second exemplary embodiment.

FIG. 20 is a flowchart of an exemplary communication process performed by the wireless communication apparatus (the first wireless communication apparatus 130) of the transfer source of MCIM according to the second embodiment of the present technology.

FIG. 20 is a modification of the process procedure shown in FIG. 14 and is different in that the communication control apparatus (second communication operator) 120 decides transfer settings, instead of the first wireless communication apparatus 130, and the user is caused to perform a confirmation operation about this decision. Thus, the same reference signs are attached to the same process procedures as those in FIG. 14 and the description thereof here is omitted.

First, the control unit 330 of the first wireless communication apparatus 130 determines whether a confirmation request transmitted by the communication control apparatus (second communication operator) 120 is received (step S961) and, if not received, continues to monitor for reception.

On the other hand, if the control unit determines that a confirmation request is received (step S961), the control unit causes the user to perform a response operation (confirmation request response operation) to the confirmation request (step S962). Next, the control unit 330 determines whether the confirmation is selected by a user's operation (step S963). If the control unit determines that the confirmation is not selected (step S963), the control unit 330 determines whether the incoming call rejection is selected (step S964) and, if the incoming call rejection is not selected, returns to step S963.

If the control unit determines that the incoming call rejection is selected (step S964), the control unit transmits incoming call rejection information (step S908) and terminates the operation of the communication process by the wireless communication apparatus of the transfer source.

On the other hand, if the control unit determines that the confirmation is selected in the determination of whether the confirmation is selected (step S963), the control unit 330 transmits a notification of selection of the confirmation (confirmation notification) to the communication control apparatus (second communication operator) 120 (step S965) before proceeding to step S910.

[Example Operation of Second Communication Operator]

Figure 21:
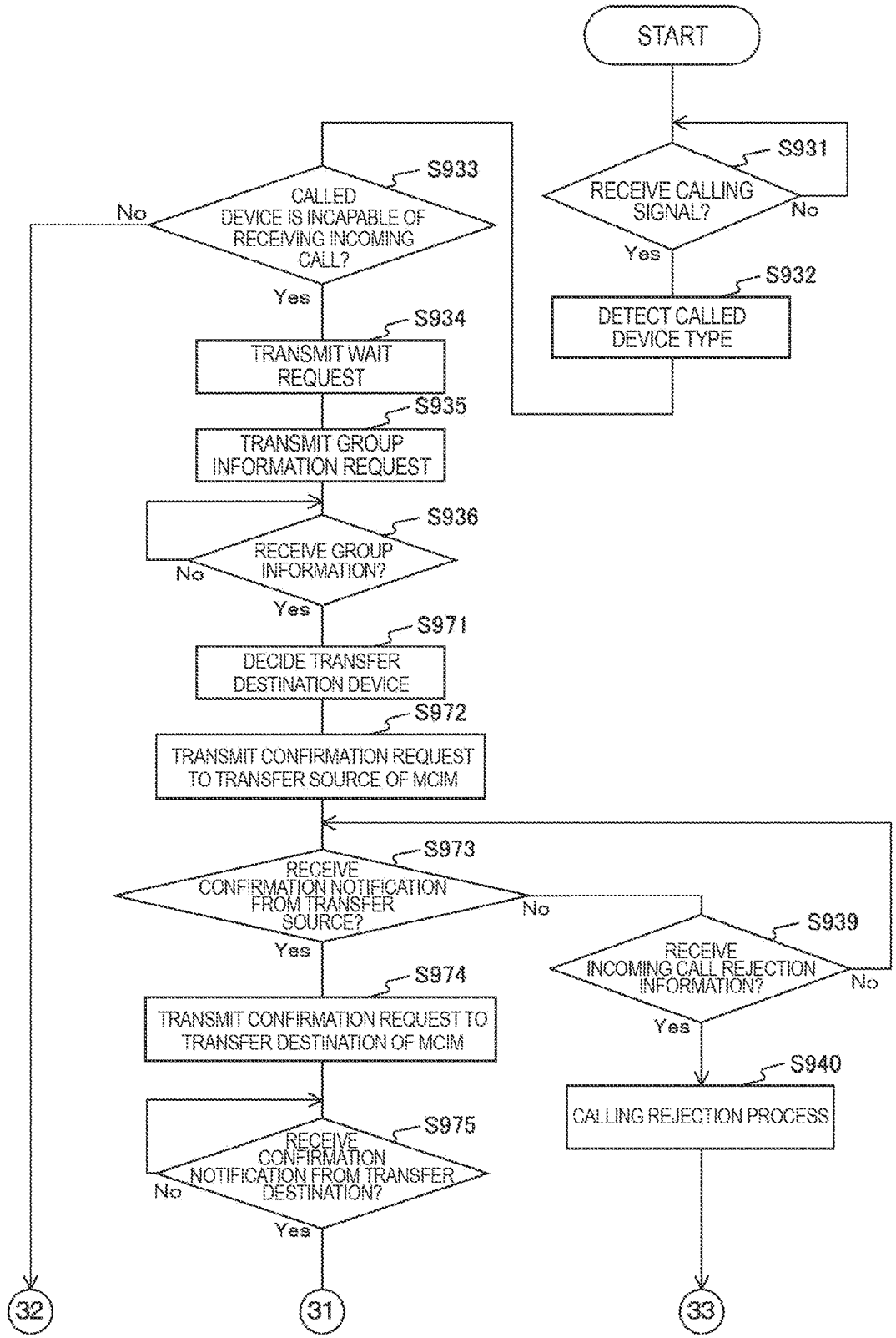
FIG. 21 is a flowchart of an exemplary communication process performed by the communication control apparatus (second communication operator) 120, according to the second exemplary embodiment.

FIG. 21 is a flowchart of an exemplary communication process performed by the communication control apparatus (second communication operator) 120 according to the second embodiment of the present technology.

FIG. 21 is a modification of the process procedure shown in FIG. 16 and is different in that instead of transmitting incoming call information containing group information to the first wireless communication apparatus 130, the wireless communication apparatus of the transfer destination of an incoming call is decided and a confirmation request of the decision is transmitted. Thus, the same reference signs are attached to the same process procedures as those in FIG. 16 and the description thereof here is omitted.

If the control unit 125 determines that group information is received in the determination of whether group information is received (step S936), the control unit 125 decides the wireless communication apparatus of the transfer destination of an incoming call based on the received group information (step S971). That is, according to the second embodiment of the present technology, the second wireless communication apparatus 300 is decided as the wireless communication apparatus of the transfer destination of an incoming call (destination of an MCIM) by the control unit 125 of the communication control apparatus (second communication operator) 120.

Then, the control unit 125 transmits a request (confirmation request) to cause the wireless communication apparatus (the first wireless communication apparatus 130) of the transfer destination of an incoming call (destination of an MCIM) to confirm the wireless communication apparatus of the transfer destination of an incoming call (step S972). Subsequently, the control unit 125 determines whether a notification of confirmation (confirmation notification) to the confirmation request is received from the first wireless communication apparatus 130 (step S973) and, if not received, continues to monitor for reception.

On the other hand, if the control unit determines that a confirmation notification is received from the first wireless communication apparatus 130 (step S973), the control unit transmits a confirmation request to the wireless communication apparatus (the second wireless communication apparatus 300) of the transfer destination of MCIM (step S974). Subsequently, the control unit 125 determines whether a confirmation notification is received from the second wireless communication apparatus 300 (step S975) and, if not received, continues to monitor for reception.

If the control unit 125 determines that a confirmation notification is received from the wireless communication apparatus of the transfer destination of MCIM (step S975), the control unit proceeds to step S941.

According to the second embodiment of the present technology, as described above, the communication control apparatus (second communication operator) 120 decides the transfer destination of MCIM and transfers the MCIM based on the decision to be able to answer an incoming call.

3. Third Embodiment

In the first and second embodiments of the present technology, examples in which an MCIM set to the first wireless communication apparatus 130 is processed to invalidate and transferred to the second wireless communication apparatus 300 are described. In this case, the first wireless communication apparatus 130 whose MCIM is invalidated can no longer perform wireless communication based on the contract with the communication control apparatus (second communication operator) 120 and cannot continue with data communication performed before the invalidation. Thus, the user may be assumed to feel uncomfortable.

Thus, in the third embodiment of the present technology, instead of invalidating the MCIM of the first wireless communication apparatus 130 and transferring the MCIM to the second wireless communication apparatus 300, a case in which another valid MCIM is temporarily set to the second wireless communication apparatus 300 will be described with reference to FIGS. 22 to 25.

An exemplary system configuration in the third embodiment of the present technology and an exemplary internal configuration of a wireless communication apparatus are similar to those shown in FIGS. 2, 3, 5, and 6 and thus, a description thereof here is omitted.

[Example Display of Transfer Setting Screen in First Wireless Communication Apparatus]

Figure 22:
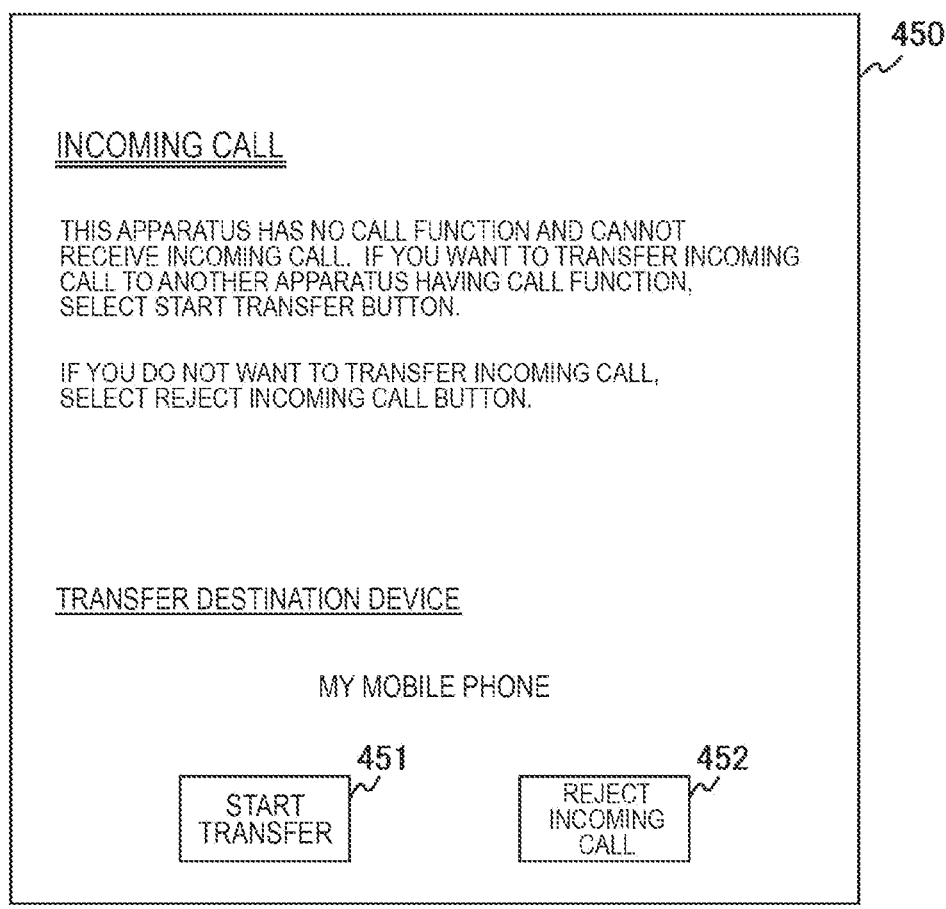
FIG. 22 is a diagram showing an exemplary display of a display screen (transfer setting screen 450) displayed in the display unit 370 of the first wireless communication apparatus 130, according to a third exemplary embodiment.

FIG. 22 is a diagram showing an exemplary display of a display screen (transfer setting screen 450) displayed in the display unit 370 of the first wireless communication apparatus 130 according to the third embodiment of the present embodiment.

The transfer setting screen 450 in FIG. 22 is a modification of the transfer setting screen 430 shown in FIG. 8. A start transfer button 451 and a reject incoming call button 452 of the transfer setting screen 450 are substantially the same as the start transfer button 431 and the reject incoming call button 432 shown in FIG. 8 and thus, the description thereof here is omitted.

The transfer setting screen 450 is different in that notes on unavailability of the communication function in the transfer setting screen 430 in FIG. 8 ("However, note that if you transfer the incoming call, you can no longer use the communication function of this apparatus") is missing.

The reason for the missing notes will be described here. In the third embodiment of the present technology, when an incoming call is transferred, the MCIM of the wireless communication apparatus of the transfer source is left intact (without performing an invalidation process) and the communication control apparatus (second communication operator) 120 sets temporary contract authentication information to the wireless communication apparatus of the transfer destination.

The temporary contract authentication information will be described here. The temporary contract authentication information is contract authentication information (MCIM) to which certain limitations are imposed and contract authentication information temporarily issued by the communication control apparatus (second communication operator) 120. As certain limitations, for example, a limitation of the number of times (for example, four times/day), a process limitation (for example, a data synchronization process only), a time limitation (for example, up to one hour), and a size limitation (for example, less than 300 KB) can be assumed. Contract authentication information on which a time limitation is imposed can be grasped as time contract authentication information (for example, an MCIM on which a limitation of automatic invalidation after the passage of a fixed time is imposed). If, for example, a limitation of usage available for only a transferred call is imposed, temporary contract authentication information is issued when a transferred call is started so as to be available for a transferred call (temporarily available) and invalidated when the transferred call ends. In addition, the communication control apparatus (second communication operator) 120 can manage the number of times of issuance of temporary contract authentication information (upper limit of the number of times of issuance per day), the amount of data, the effective time and the like.

While a display example when the number of wireless communication apparatuses equipped with the call function in the group is one is described in FIG. 22, notes are also missing when a plurality of wireless communication apparatuses equipped with the call function is present. That is, a display example obtained by eliminating notes from the display example in FIG. 9 becomes the transfer setting screen displayed when a plurality of wireless communication apparatuses equipped with the call function is present in the third embodiment of the present technology.

[Example Communication when Incoming Call Transfer Process is Performed]

Figure 23:
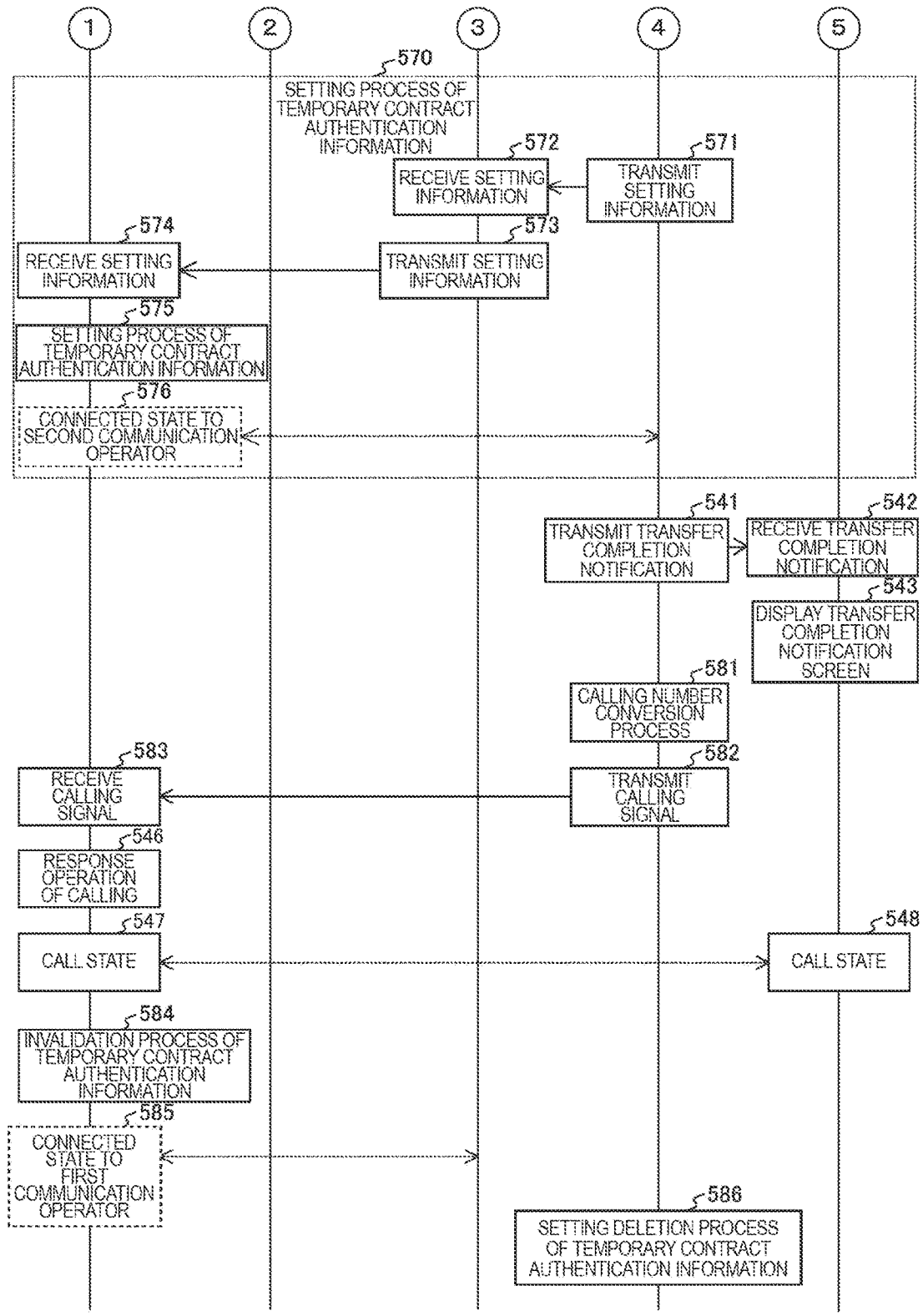
FIG. 23 is a sequence chart of an exemplary communication process performed by various apparatuses of a communication system, according to a third exemplary embodiment.

FIG. 23 is a sequence chart of an exemplary communication process performed by various apparatuses of a communication system according to the third embodiment of the present technology.

The sequence chart shown in FIG. 23 is a modification of the sequence chart shown in FIGS. 12 and 13 and is different in that the communication control apparatus (second communication operator) 120 issues temporary contract authentication information. Thus, in FIG. 23, the same reference signs as those in FIGS. 12 and 13 are attached to portions common to those in FIGS. 12 and 13 to omit the description thereof here. The portion prior to the sequence chart shown in FIG. 23 (portion corresponding to FIG. 11) is similar to FIG. 11 and thus, an illustration and description thereof here is omitted.

In FIG. 23, instead of the communication process of the MCIM transfer process 520 shown in FIG. 12, a communication process (temporary contract authentication information setting process 570) to set temporary contract authentication information is shown. Also in FIG. 23, after the temporary contract authentication information setting process 570, the communication processes (541 to 548) shown in FIG. 13 and processes (582 to 584) concerning invalidation of temporary contract authentication information are shown.

Each communication process shown in FIG. 23 will be described. First, when the communication control apparatus (second communication operator) 120 receives transfer setting information (519 in FIG. 11), the control unit 125 of the communication control apparatus (second communication operator) 120 transmits setting information of temporary contract authentication information to the second wireless communication apparatus 300 (571 to 574). The setting information of temporary contract authentication information is information to set temporary contract authentication information to a wireless communication apparatus. In this case, the second wireless communication apparatus 300 is in a connected state with the communication control apparatus (first communication operator) 200 (502 in FIG. 11). Thus, the setting information of temporary contract authentication information is transmitted from the communication control apparatus (second communication operator) 120 to the second wireless communication apparatus 300 via the communication control apparatus (first communication operator) 200 (571 to 574).

When the second wireless communication apparatus 300 receives the setting information of temporary contract authentication information (574), a setting process of temporary contract authentication information is performed on the MCIM information storage unit 350 of the second wireless communication apparatus 300 (575). The temporary contract authentication information is thereby set to the second wireless communication apparatus 300 and thus, the second wireless communication apparatus 300 can establish connection to the communication control apparatus (second communication operator) 120 based on the temporary contract authentication information (576). That is, the second wireless communication apparatus 300 is in a connected state to the communication control apparatus (second communication operator) 120 through connection based on the temporary contract authentication information (576).

Then, when the second wireless communication apparatus 300 enters a connected state to the communication control apparatus (second communication operator) 120 (576), like FIG. 13, the user of the communication apparatus 150 on the calling side is notified of the end of the transfer process (541 to 543). The communication control apparatus (second communication operator) 120 performs a calling signal conversion process (581). The calling signal conversion process is a process that converts the phone number called (dialed) by the user of the communication apparatus 150 on the calling side into a phone number provided in the temporary contract authentication information. Then, the communication control apparatus (second communication operator) 120 transmits a calling signal to the second wireless communication apparatus 300 by calling the converted phone number (582, 583).

The communication processes (546 to 548) after the second wireless communication apparatus 300 answers the calling signal until a call state is entered are similar to those shown in FIG. 13 and thus, the description thereof here is omitted.

Then, when, after the second wireless communication apparatus 300 and the communication apparatus 150 on the calling side enter a call state (547, 548), the call ends, an invalidation process of the temporary contract authentication information in the MCIM information storage unit 350 of the second wireless communication apparatus 300 is performed (584). The temporary contract authentication information held by the second wireless communication apparatus 300 is thereby invalidated and thus, the second wireless communication apparatus 300 can no longer establish connection to the communication control apparatus (second communication operator) 120 based on the temporary contract authentication information. Thus, the second wireless communication apparatus 300 is in a connected state connected to the communication control apparatus (first communication operator) 200 by a limited connection based on PCID (585). Then, the communication control apparatus (second communication operator) 120 discards (deletes) information about settings of temporary contract authentication information (586) before terminating the communication process.

[Example Operation of Communication System]

Next, the operation of the communication system according to the third embodiment of the present technology will be described with reference to drawings.

[Example Operation of Wireless Communication Apparatus Holding MCIM]

Figure 24:
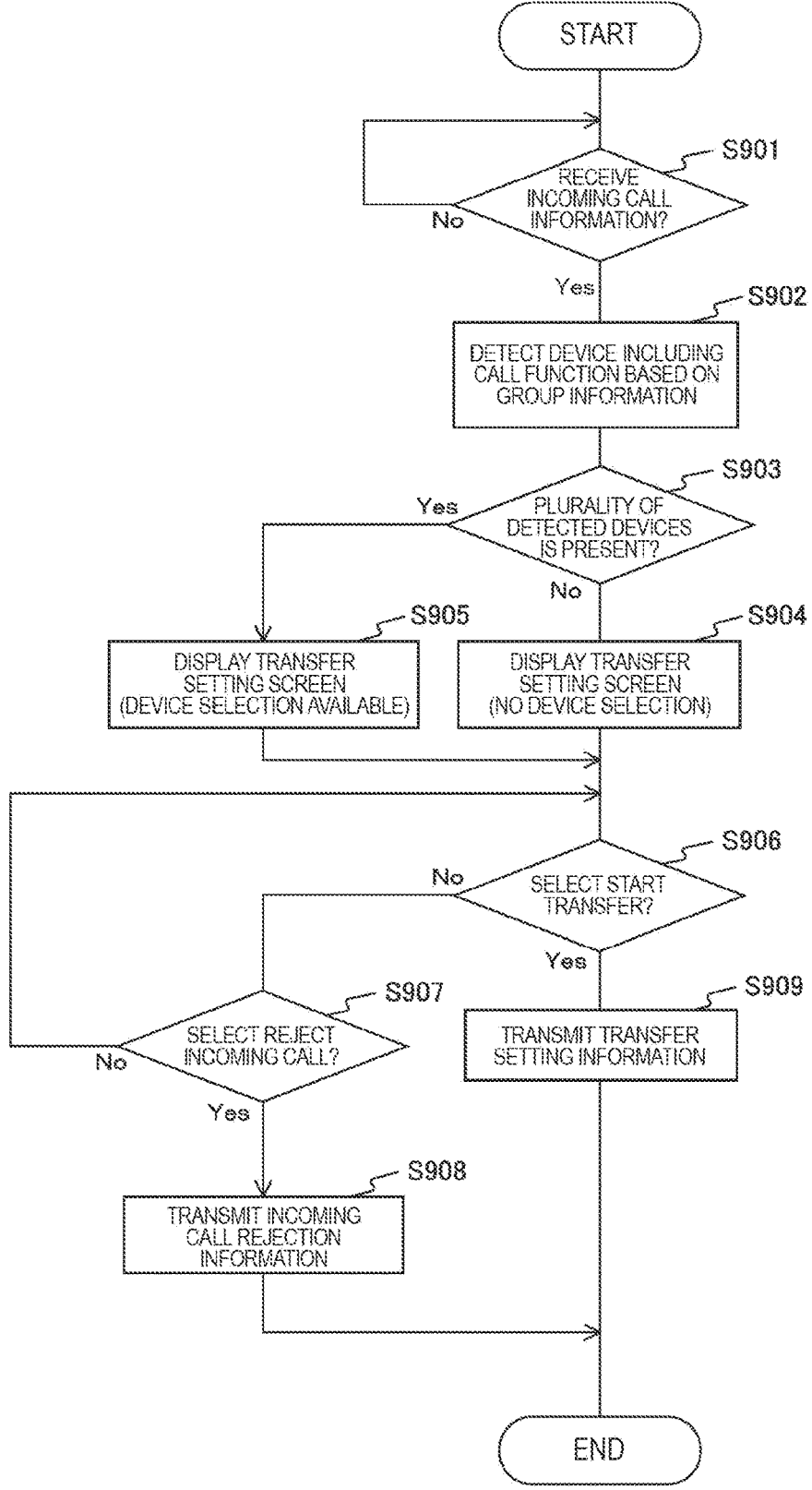
FIG. 24 is a flowchart of an exemplary communication process performed by the wireless communication apparatus (the first wireless communication apparatus 130) holding MCIM, according to the third exemplary embodiment.

FIG. 24 is a flowchart of an exemplary communication process performed by the wireless communication apparatus (the first wireless communication apparatus 130) holding MCIM according to the third embodiment of the present technology.

FIG. 24 is a modification of the processing procedure shown in FIG. 14 and is the same as FIG. 14 except that invalidation information of MCIM is not received and an invalidation process of MCIM is not performed. That is, in the flow chart shown in FIG. 24, steps S910 and S911 shown in FIG. 14 are missing. Otherwise, FIG. 24 is the same as FIG. 14 and thus, the description thereof here is omitted.

[Example Operation of Wireless Communication Apparatus to which Temporary Contract Authentication Information is Set]

Figure 25:
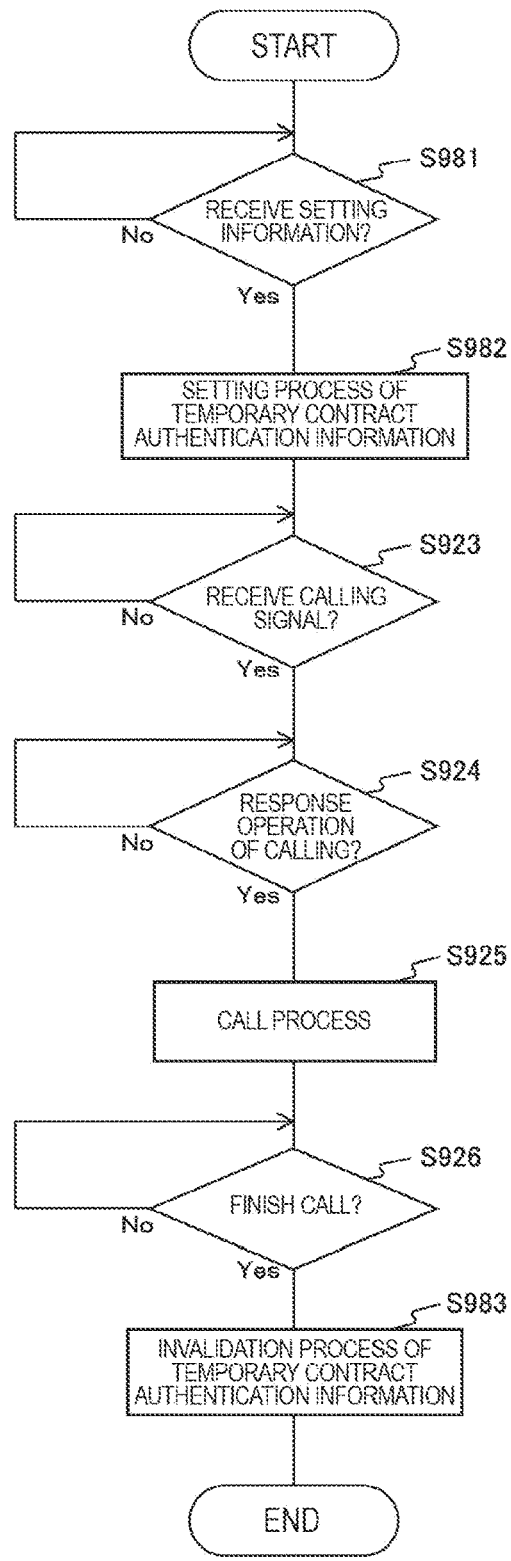
FIG. 25 is a flowchart of an exemplary communication process performed by the wireless communication apparatus (the second wireless communication apparatus 300) to which temporary contract authentication information is set, according to the third exemplary embodiment.

FIG. 25 is a flowchart of an exemplary communication process performed by the wireless communication apparatus (the second wireless communication apparatus 300) to which temporary contract authentication information is set according to the third embodiment of the present technology.

FIG. 25 is a modification of the process procedure shown in FIG. 15 and is different in that temporary contract authentication information is set, instead of an MCIM being set. Thus, the same reference signs are attached to the same process procedures as those in FIG. 15 and the description thereof here is omitted.

First, the control unit 330 determines whether setting information transmitted from the communication control apparatus (second communication operator) 120 is received (step S981) and, if not received, continues to monitor for reception. The setting information in step S981 is setting information to set temporary contract authentication information and the setting information in step S921 of FIG. 15 is setting information to set an MCIM (contract authentication information).

On the other hand, if the control unit determines that setting information is received (step S981), the control unit 330 performs a setting process of temporary contract authentication information to the MCIM information storage unit 350 (step S982) before proceeding to step S923.

Then, after the end of the call is determined in step S926, the control unit 330 performs a process (invalidation process) to invalidate the temporary contract authentication information (step S983) to terminate the operation of the communication process by the wireless communication apparatus to which the temporary contract authentication information is set.

[Example Operation of Second Communication Operator]

Figure 26:
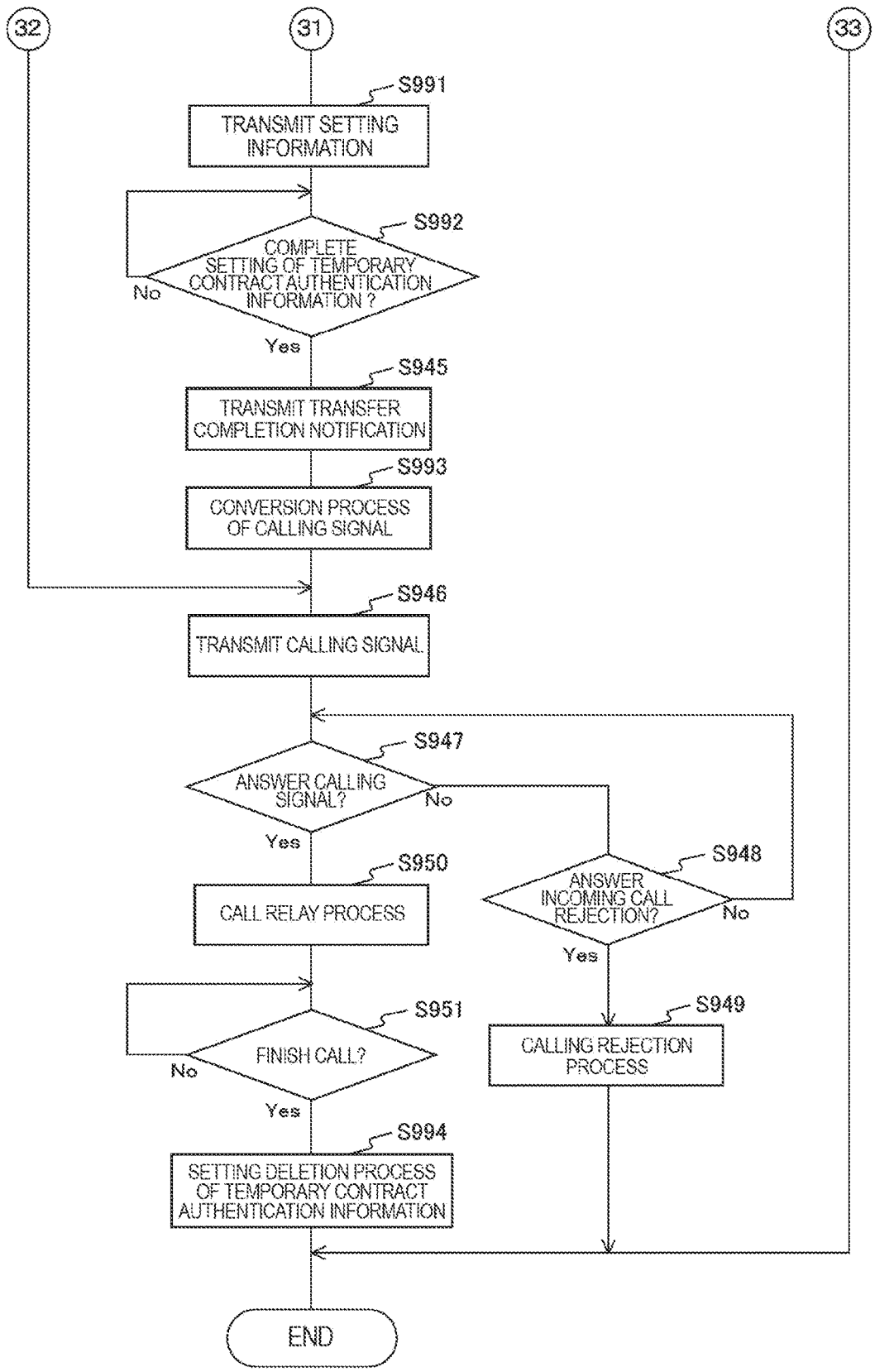
FIG. 26 is a flowchart of an exemplary communication process performed by the communication control apparatus (second communication operator) 120, according to the third exemplary embodiment.

FIG. 26 is a flowchart of an exemplary communication process performed by the communication control apparatus (second communication operator) 120 according to the third embodiment of the present technology.

FIG. 26 is a modification of the processing procedure shown in FIG. 17 and is different in that temporary contract authentication information is made to be set to the second wireless communication apparatus 300. Thus, the same reference signs are attached to the same process procedures as those in FIG. 17 and the description thereof here is omitted. The portion prior to the flow chart shown in FIG. 26 (portion corresponding to FIG. 16) is similar to FIG. 16 and thus, an illustration and description thereof here is omitted.

First, if the control unit 125 determines that transfer setting information is received in the determination of whether transfer setting information transmitted by the first wireless communication apparatus 130 is received (step S938 in FIG. 16), the control unit 125 transmits the setting information of temporary contract authentication information to the second wireless communication apparatus 300 (step S991). Then, the control unit 125 determines whether temporary contract authentication information settings in the second wireless communication apparatus 300 are completed (step S992) and, if not completed, continues to monitor for completion.

If the control unit 125 determines that temporary contract authentication information settings in the second wireless communication apparatus 300 are completed (step S992), the control unit 125 transmits a transfer completion notification to the communication apparatus 150 on the calling side (step S945). Then, the control unit 125 performs a conversion process of converting the phone number of a calling signal submitted by the communication apparatus 150 on the calling side into the phone number of the temporary contract authentication information (step S993) before proceeding to step S946.

Then, if the control unit determines that the call is finished in the determination of whether the call is finished (step S951), the control unit performs a process (setting deletion process) to delete temporary contract authentication information settings (step S994) before terminating the operation of the communication process.

According to the third embodiment of the present technology, as described above, an incoming call to the first wireless communication apparatus 130 can be answered by setting temporary contract authentication information to the second wireless communication apparatus 300 without the need to invalidate the MCIM of the first wireless communication apparatus 130.

In the third embodiment of the present technology, unavailability of the communication function of the first wireless communication apparatus 130 is avoided. Thus, an incoming call can automatically be made to be transferred without displaying the transfer setting screen 450.

Therefore, according to the embodiments of the present technology, calling to a function not included in a wireless communication apparatus holding an MCIM can be answered.

In the first and second embodiments of the present technology, example in which after an MCIM being transferred to the second wireless communication apparatus 300, the MCIM is left alone are described, but the first and second embodiments are not limited to such examples. For example, a case when the MCIM is returned to the original wireless communication apparatus (the first wireless communication apparatus 130) can also be considered.

In the first embodiment of the present technology, incoming call information containing group information is transmitted to the first wireless communication apparatus 130, but the first embodiment is not limited to such an example. For example, a case when the first wireless communication apparatus 130 always holds group information and decides the transfer destination of an MCIM based on the held group information can also be considered.

The embodiments of the present technology have been described by taking integrally configured information processing apparatuses (the communication control apparatuses 120, 200 and the like) as an example. However, the embodiments of the present technology can also be applied to an information processing system in which each unit (for example, the control unit or the group management database 220) included in these information processing apparatuses is formed from a plurality of apparatuses. While the embodiments of the present technology have been described by taking the group AB formed from three or four wireless communication apparatuses as an example, the embodiments of the present technology can also be applied to a group formed from two or five or more wireless communication apparatuses. The embodiments of the present technology have been described by taking a case when a communication process is performed between a plurality of wireless communication apparatuses forming a group as an example. However, the embodiments of the present technology can also be applied when a communication process is performed between a plurality of wireless communication apparatuses that do not form a group. In such a case, for example, the remote party to perform a communication process with can be set by a user's operation (for example, an input operation of identification information to identify the remote wireless communication apparatus).

In addition, the embodiments of the present technology can be applied to mobile wireless communication apparatuses (for example, terminal apparatuses dedicated to data communication) and fixed wireless communication apparatuses. For example, the embodiments of the present technology can be applied to wireless communication apparatuses for the purpose of collecting data of vending machines and wireless communication apparatuses mounted on elevators, automobiles, and electronic devices (for example, home appliances, game machines, and digital photo-frames).

Examples where use rights over an MCIM are used as network connection rights are described above in the embodiments of the present disclosure. However, it is also possible to apply the embodiments of the present disclosure to connection rights for connecting to a specified network based on other information (for example, a USIM (Universal Subscriber Identity Module)).

The above-described embodiments are examples for embodying the present technology, and matters in the embodiments each have a corresponding relationship with invention-specific matters in the claims. Likewise, the matters in the embodiments and the invention-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording media storing the program. As the recording media, a hard disk, a CD (Compact Disc), an MD (Mini-Disc), and a DVD (Digital Versatile Disk) can be used. In addition, a memory card, and a Blu-ray disc (registered trademark) can be used.

Additionally, the present technology may also be configured as below.

(1)
An information processing apparatus including:
a receiving unit that receives an execution request to cause a wireless communication apparatus to execute a specific function by using a connection right to connect to a predetermined network using wireless communication,
wherein the connection right is set to a first wireless communication apparatus not including the specific function when the execution request is received, and when the connection right is not set to a second wireless communication apparatus including the specific function, the connection right is made to be set to the second wireless communication apparatus to cause the second wireless communication apparatus to execute the specific function in accordance with the execution request.

(2)
The information processing apparatus according to (1),
wherein the information processing apparatus is the first wireless communication apparatus,
wherein the information processing apparatus further includes a control unit that, when the execution request is received, carries out control to transmit a setting request to cause the connection right to be set to the second wireless communication apparatus to a management system that manages the connection right.

(3)
The information processing apparatus according to (2),
wherein a group sharing the connection right includes a plurality of wireless communication apparatuses including the information processing apparatus, and
wherein the control unit carries out control to identify, among the plurality of wireless communication apparatuses included in the group, a wireless communication apparatus including the specific function as the second wireless communication apparatus.

(4)
The information processing apparatus according to (3),
wherein when a plurality of wireless communication apparatuses including the specific function is present, the control unit carries out control to identify, as the second wireless communication apparatus, one wireless communication apparatus selected from the plurality of wireless communication apparatuses based on a user's operation.

(5)
The information processing apparatus according to (3) or (4),
wherein identification information to identify each of the wireless communication apparatuses included in the group is stored in an RO (Registration Operator) that manages the group, and
wherein the control unit acquires the identification information from the RO to cause a display unit to display a selection screen to select the second wireless communication apparatus from the plurality of wireless communication apparatuses included in the group based on the acquired identification information and carries out control to identify a wireless communication apparatus selected based on a user's operation on the selection screen as the second wireless communication apparatus.

(6)
The information processing apparatus according to any one of (2) to (5),
wherein the management system is an SHO (Selected Home Operator),
wherein the control unit makes the setting request to the SHO, and
wherein the second wireless communication apparatus carries out control to execute the specific function using the connection right set by the SHO in accordance with the setting request.

(7)
The information processing apparatus according to (1),
wherein the information processing apparatus is an information processing apparatus that manages the connection right, and
wherein the information processing apparatus further includes a control unit that, when the execution request is received, carries out control to cause the second wireless communication apparatus to execute the specific function in accordance with the execution request by causing the connection right to be set to the second wireless communication apparatus.

(8)
The information processing apparatus according to (7),
wherein when the execution request is received, the control unit determines whether the specific function is included in a wireless communication apparatus to which the connection right is set and carries out the control based on a determination result.

(9)
The information processing apparatus according to (7) or (8), wherein a group sharing the connection right includes a plurality of wireless communication apparatuses including the first wireless communication apparatus, and wherein the control unit carries out control to identify, among the plurality of wireless communication apparatuses included in the group, a wireless communication apparatus including the specific function as the second wireless communication apparatus.

(10)

The information processing apparatus according to (9), wherein the control unit identifies one wireless communication apparatus selected based on a user's operation as the second wireless communication apparatus.

(11)

The information processing apparatus according to (9) or (10), wherein identification information to identify each of the wireless communication apparatuses included in the group is stored in an RO that manages the group, and wherein the control unit acquires the identification information from the RO to carry out control to transmit the acquired identification information to the first wireless communication apparatus.

(12)

The information processing apparatus according to (11), wherein the control unit carries out control to transmit the acquired identification information as information to cause a display unit of the first wireless communication apparatus to display a selection screen to select the second wireless communication apparatus from the plurality of wireless communication apparatuses included in the group to the first wireless communication apparatus.

(13)

The information processing apparatus according to any one of (1) to (12), wherein the specific function is a call function.

(14)

The information processing apparatus according to (13), wherein the information processing apparatus is the first wireless communication apparatus, and wherein the first wireless communication apparatus receives the execution request via a data communication function.

(15)

The information processing apparatus according to any one of (1) to (14), wherein the second wireless communication apparatus is caused to execute the specific function after the connection right set to the first wireless communication apparatus is transferred to the second wireless communication apparatus.

(16)

The information processing apparatus according to any one of (1) to (14), wherein the second wireless communication apparatus is caused to execute the specific function by causing a second connection right to be set to the second wireless communication apparatus, the second connection right being a connection right more limited than the connection right set to the first wireless communication apparatus and causing the second wireless communication apparatus to execute the specific function in accordance with the execution request.

(17)

The information processing apparatus according to any one of (1) to (16), wherein the connection right is a right to connect to a base station based on contract authentication information to connect to the base station operated by a communication operator.

(18)

A communication system including:

a first wireless communication apparatus as a wireless communication apparatus to which a connection right to connect to a predetermined network using wireless communication is set, the wireless communication apparatus not including a specific function; and a second wireless communication apparatus as a wireless communication apparatus to which the connection right is not set, the wireless communication apparatus including the specific function, wherein the connection right is set to the first wireless communication apparatus when an execution request to cause the wireless communication apparatus to execute the specific function is received, and when the connection right is not set to the second wireless communication apparatus, the connection right is made to be set to the second wireless communication apparatus to cause the second wireless communication apparatus to execute the specific function in accordance with the execution request.

(19)

A control method of an information processing apparatus, the control method including:

a reception procedure of receiving an execution request to cause a wireless communication apparatus to execute a specific function by using a connection right to connect to a predetermined network using wireless communication; and an execution procedure of setting the connection right to a first wireless communication apparatus not including the specific function when the execution request is received, and causing, when the connection right is not set to a second wireless communication apparatus including the specific function, the connection right to be set to the second wireless communication apparatus to cause the second wireless communication apparatus to execute the specific function in accordance with the execution request.

REFERENCE SIGNS LIST 10 communication system
21, 31, 121, 122, 206 base station
40 network
51 communication apparatus on the calling side
90 user
100 communication system
110 network
120 communication control apparatus (second communication operator)
125, 210, 330 control unit
130 first wireless communication apparatus
140 third wireless communication apparatus
150 communication apparatus on the calling side
200 communication control apparatus (first communication operator)

The invention claimed is:

1. An information processing apparatus, comprising:
a processor configured to:
receive an execution request from a communication apparatus, wherein the execution request causes execution of a call function by one of
a first connection right or a second connection right, each of the first connection right and the second connection right is a right to connect to a network via wireless communication based on a contract authentication information, and
the first connection right is set to a first wireless communication apparatus;
detect one of presence or absence of the call function in the first wireless communication apparatus;
transmit an invalidation message for the first connection right to the first wireless communication apparatus based on a result of the detection that the call function is absent in the first wireless communication apparatus;
transmit the second connection right to a second wireless communication apparatus based on the result of the detection that the call function is absent in the first wireless communication apparatus, wherein
the second connection right is the first connection right associated with a plurality of limitations,
the plurality of limitations include at least one of a number limitation indicating number of times of connection to the network, a process limitation indicating a process for the connection to the network, or a size limitation indicating an amount of data for the connection to the network,
the second connection right is associated with a time limitation, and
the second connection right causes the second wireless communication apparatus to execute the call function based on the execution request;
invalidate the second connection right of the second wireless communication apparatus based on completion of the call function; and
delete the second connection right from the second wireless communication apparatus after the invalidation of the second connection right.

2. The information processing apparatus according to claim 1, wherein
the information processing apparatus is the first wireless communication apparatus,
the processor is further configured to transmit a setting request to a management system,
the management system manages the first connection right based on the execution request, and
the second connection right is set to the second wireless communication apparatus based on the setting request.

3. The information processing apparatus according to claim 2, wherein
the management system is a Selected Home Operator (SHO), and
the processor is further configured to:
transmit the setting request to the SHO; and
control the second wireless communication apparatus to execute the call function based on the second connection right, wherein the second connection right is set by the SHO based on the setting request.

4. The information processing apparatus according to claim 1, wherein
the first connection right is shared among a plurality of wireless communication apparatuses,
the plurality of wireless communication apparatuses includes the first wireless communication apparatus and the second wireless communication apparatus,
the plurality of wireless communication apparatuses are set as a group,
the plurality of wireless communication apparatuses includes the information processing apparatus, and
the processor is further configured to identify the second wireless communication apparatus based on presence of the call function among the plurality of wireless communication apparatuses included in the group.

5. The information processing apparatus according to claim 4, further comprising a display unit, and
wherein the processor is further configured to:
acquire identification information from a Registration Operator (RO) to display a selection screen on the display unit;
control the display unit to display the selection screen to receive selection of the second wireless communication apparatus from the plurality of wireless communication apparatuses included in the group;
select the second wireless communication apparatus from the plurality of wireless communication apparatuses based on the identification information;
identify each wireless communication apparatus of the plurality of wireless communication apparatuses based on the identification information, wherein
the identification information is stored in the RO, and the RO manages the group; and
select the second wireless communication apparatus based on a user operation on the selection screen.

6. The information processing apparatus according to claim 1,
wherein the processor is further configured to:
identify the second wireless communication apparatus from a plurality of wireless communication apparatuses based on presence of the call function among the plurality of wireless communication apparatuses,
wherein the plurality of wireless communication apparatuses includes the first wireless communication apparatus and the second wireless communication apparatus; and
select the second wireless communication apparatus from the plurality of wireless communication apparatuses based on a user operation.

7. The information processing apparatus according to claim 1,
wherein the processor is further configured to:
manage the first connection right; and
control the second wireless communication apparatus to execute the call function based on the second connection right set to the second wireless communication apparatus, wherein the second wireless communication apparatus executes the call function based on the execution request.

8. The information processing apparatus according to claim 7,
wherein the processor is further configured to:
determine presence of the call function in the second wireless communication apparatus that is set with the second connection right; and
control the second wireless communication apparatus to execute the call function based on the presence of the call function.

9. The information processing apparatus according to claim 1, wherein
the first connection right is shared among a plurality of wireless communication apparatuses,
the plurality of wireless communication apparatuses includes the first wireless communication apparatus and the second wireless communication apparatus,
the plurality of wireless communication apparatuses are set as a group, the plurality of wireless communication apparatuses includes the first wireless communication apparatus, and the processor is further configured to identify the second wireless communication apparatus based on presence of the call function among the plurality of wireless communication apparatuses included in the group.

10. The information processing apparatus according to claim 9, wherein the processor is further configured to:
select the second wireless communication apparatus from the plurality of wireless communication apparatuses based on a user operation; and
identify the selected second wireless communication apparatus.

11. The information processing apparatus according to claim 9, wherein
the processor is further configured to:
acquire identification information from a Registration Operator (RO);
transmit the identification information to the first wireless communication apparatus; and
identify each wireless communication apparatus of the plurality of wireless communication apparatuses based on the identification information,
the identification information is stored in the RO, and the RO manages the group.

12. The information processing apparatus according to claim 11,
wherein the processor is further configured to:
transmit the identification information as display information to the first wireless communication apparatus;
control a display unit of the first wireless communication apparatus to display a selection screen based on the display information; and
control the display unit to display the selection screen to receive selection of the second wireless communication apparatus from the plurality of wireless communication apparatuses included in the group.

13. The information processing apparatus according to claim 1, wherein
the information processing apparatus is the first wireless communication apparatus, and
the first wireless communication apparatus receives the execution request via data communication.

14. The information processing apparatus according to claim 1,
wherein the second wireless communication apparatus executes the call function based on a transmission of the first connection right from the first wireless communication apparatus to the second wireless communication apparatus.

15. The information processing apparatus according to claim 1, wherein
the processor is further configured to set the second connection right to the second wireless communication apparatus, and
the second connection right causes the second wireless communication apparatus to execute the call function based on the execution request.

16. A communication system, comprising:
a first wireless communication apparatus to which a first connection right is set, wherein
the first connection right is a right to connect to a network via wireless communication based on a contract authentication information, and
the first wireless communication apparatus;

a second wireless communication apparatus that includes a call function; and
a processor configured to:
receive an execution request from a communication apparatus, wherein the execution request causes execution of the call function;
detect one of presence or absence of the call function in the first wireless communication apparatus;
transmit an invalidation message for the first connection right to the first wireless communication apparatus based on a result of the detection that the call function is absent in the first wireless communication apparatus;
transmit a second connection right to the second wireless communication apparatus based on the result of the detection that the call function is absent in the first wireless communication apparatus, wherein
the second connection right is the first connection right associated with a plurality of limitations,
the plurality of limitations include at least one of a number limitation indicating number of times of connection to the network, a process limitation indicating a process for the connection to the network, or a size limitation indicating an amount of data for the connection to the network,
the second connection right is associated with a time limitation, and
the second connection right causes the second wireless communication apparatus to execute the call function based on the execution request;
invalidate the second connection right of the second wireless communication apparatus based on completion of the call function; and
delete the second connection right from the second wireless communication apparatus after the invalidation of the second connection right.

17. The communication system according to claim 16, wherein
the processor is further configured to set the second connection right to the second wireless communication apparatus, and
the second connection right causes the second wireless communication apparatus to execute the call function based on the execution request.

18. The communication system according to claim 16, wherein
the processor is further configured to detect a plurality of wireless communication devices that include the call function,
the plurality of wireless communication devices includes the second wireless communication apparatus,
the plurality of wireless communication devices are detected based on analysis of a group management database,
the group management database includes first information that indicates presence of the call function in association with second information, and
the second information indicates a status of storage of contract authentication information in each wireless communication device of the plurality of wireless communication devices that share the first connection right.

19. A control method, comprising:
in an information processing apparatus:
receiving an execution request from a communication apparatus, wherein the execution request causes execution of a call function by one of a first connection right or a second connection right, each of the first connection right and the second connection right is a right to connect to a network via wireless communication based on a contract authentication information, the first connection right is set to a first wireless communication apparatus;

detecting one of presence or absence of the call function in the first wireless communication apparatus;

transmitting an invalidation message for the first connection right to the first wireless communication apparatus based on a result of the detection that the call function is absent in the first wireless communication apparatus;

transmitting the second connection right to a second wireless communication apparatus based on the result of the detection that the call function is absent in the first wireless communication apparatus, wherein the second connection right is the first connection right associated with a plurality of limitations, the plurality of limitations include at least one of a number limitation indicating number of times of connection to the network, a process limitation indicating a process for the connection to the network, or a size limitation indicating an amount of data for the connection to the network, the second connection right is associated with a time limitation, and the second connection right causes the second wireless communication apparatus to execute the call function based on the execution request;

invalidating the second connection right of the second wireless communication apparatus based on completion of the call function; and deleting the second connection right from the second wireless communication apparatus after the invalidation of the second connection right.

20. The control method of claim 19, further comprising setting the second connection right to the second wireless communication apparatus, wherein the second connection right causes the second wireless communication apparatus to execute the call function based on the execution request.

* * * * *